United States Patent
Crill

(10) Patent No.: US 7,103,223 B2
(45) Date of Patent: *Sep. 5, 2006

(54) APPARATUS AND METHOD FOR RADIAL AND ANGULAR OR ROTATIONAL ANALYSIS OR IMAGES FOR SHAPE CONTENT AND MATCHING

(75) Inventor: Rikk Crill, Longmont, CO (US)

(73) Assignee: Look Dynamics, Inc., Longmont, CO (US)

( * ) Notice: Subject to any disclaimer, the term of this patent is extended or adjusted under 35 U.S.C. 154(b) by 328 days.

This patent is subject to a terminal disclaimer.

(21) Appl. No.: 10/385,192

(22) Filed: Mar. 10, 2003

(65) Prior Publication Data

US 2003/0219158 A1  Nov. 27, 2003

Related U.S. Application Data

(63) Continuation-in-part of application No. 10/051,364, filed on Jan. 18, 2002, now abandoned, which is a continuation-in-part of application No. 09/536,426, filed on Mar. 27, 2000, now Pat. No. 6,678,411.

(51) Int. Cl.
*G06K 9/76* (2006.01)

(52) U.S. Cl. .................. 382/211; 382/280; 708/403

(58) Field of Classification Search ............ 382/106, 382/127, 140–146, 151–152, 168, 177, 189, 382/199, 203, 210, 211, 248, 250, 260–266, 382/274, 278, 280, 295, 296, 305, 321; 348/94; 356/237.5, 237.1; 359/561; 708/403

See application file for complete search history.

(56) References Cited

U.S. PATENT DOCUMENTS

| | | | | |
|---|---|---|---|---|
| 3,771,124 A | * | 11/1973 | McMahon | 382/127 |
| 4,462,046 A | * | 7/1984 | Spight | 348/94 |
| 4,923,297 A | * | 5/1990 | Arndt | 351/208 |
| 5,177,559 A | * | 1/1993 | Batchelder et al. | 356/237.5 |
| 5,216,541 A | * | 6/1993 | Takesue et al. | 359/561 |
| 5,264,912 A | * | 11/1993 | Vaught et al. | 356/237.5 |
| 5,659,637 A | * | 8/1997 | Bagley et al. | 382/278 |

* cited by examiner

*Primary Examiner*—Jingge Wu
*Assistant Examiner*—Seyed Azarian
(74) *Attorney, Agent, or Firm*—Cochran Freund & Young LLC; James R. Young

(57) ABSTRACT

A segmented radial spatial light modulator has an active optic area comprising a plurality of radially extending active optic modulators disposed at various angular orientations with respect to a central axis. The segmented radial spatial light modulator is used in separating and isolating portions of Fourier transform optic patterns from images for characterization of images by shape for recording, storing, retrieving, searching, and comparison to other images for matches and near matches. The images can be ghosted to increase optical power in the Fourier transform optic pattern without adding new shape content and for grading comparisons to other image shape characteristics for identifying near matches in addition to matches.

20 Claims, 18 Drawing Sheets

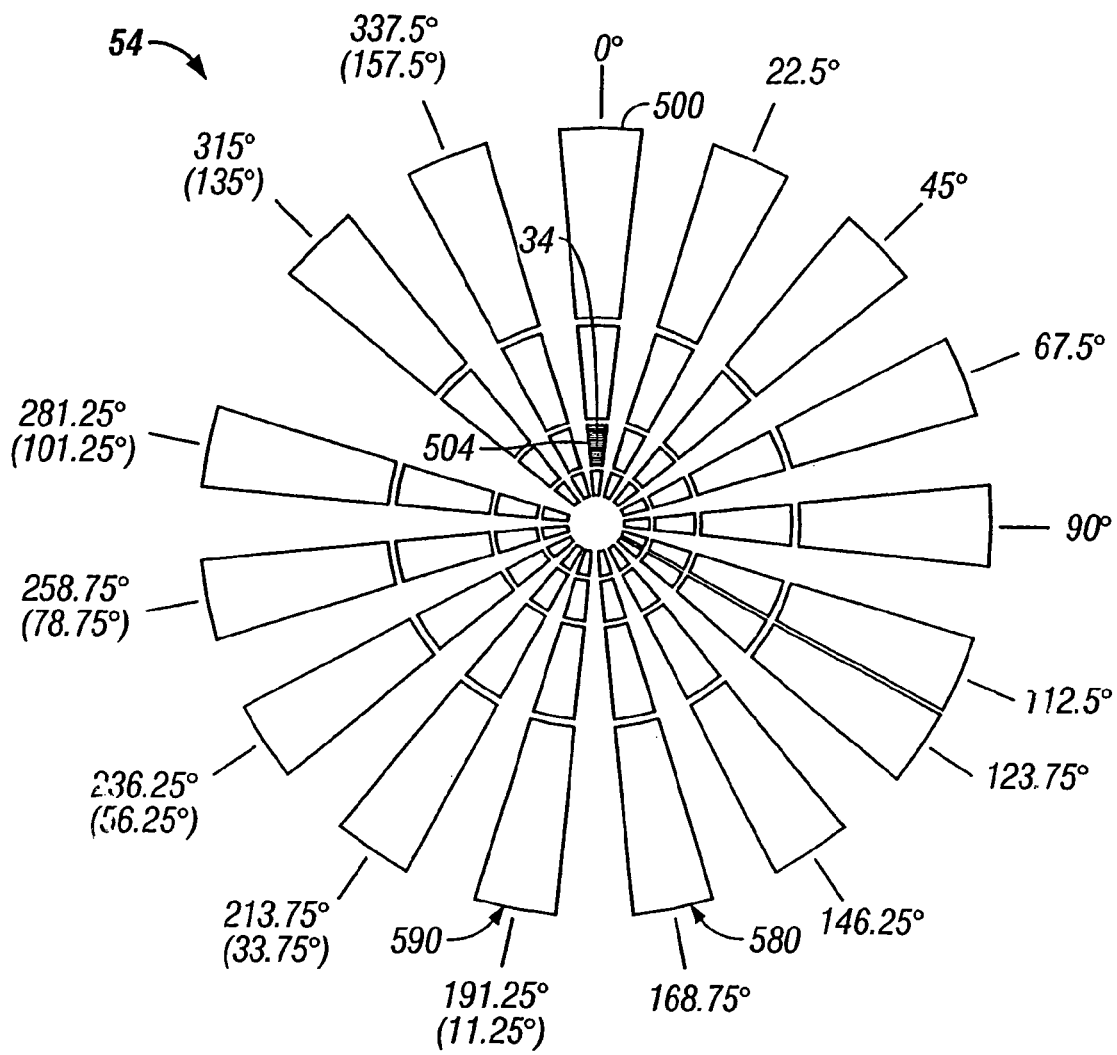
FIG. 11A
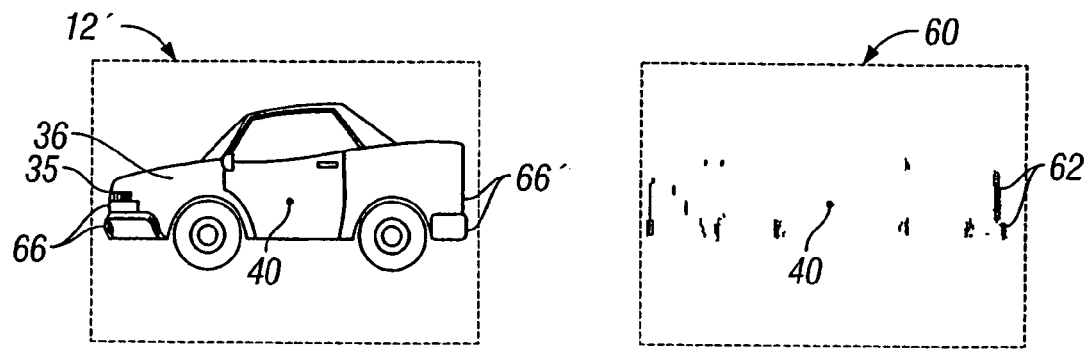
FIG. 11B  FIG. 11C

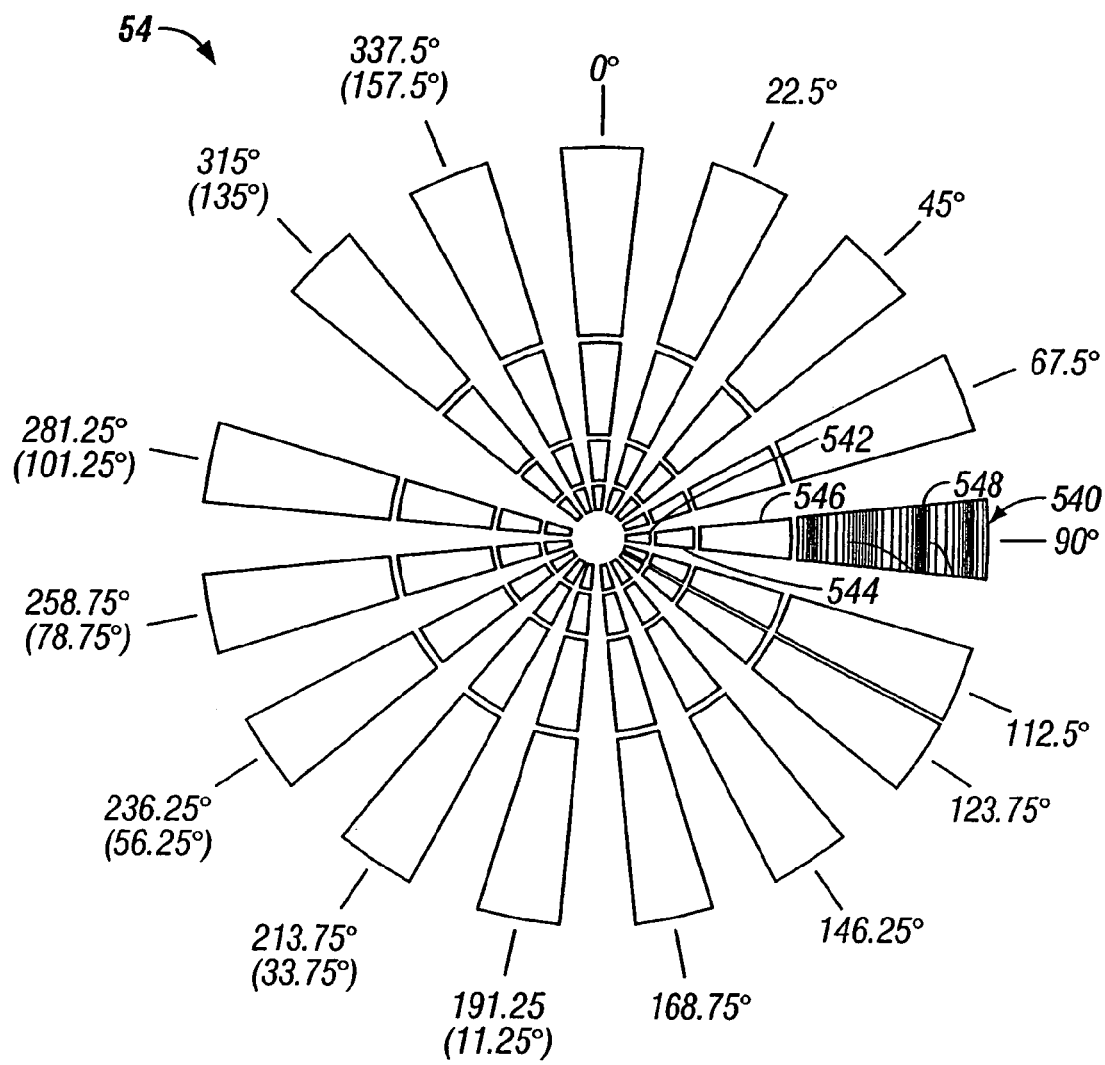
FIG. 13A
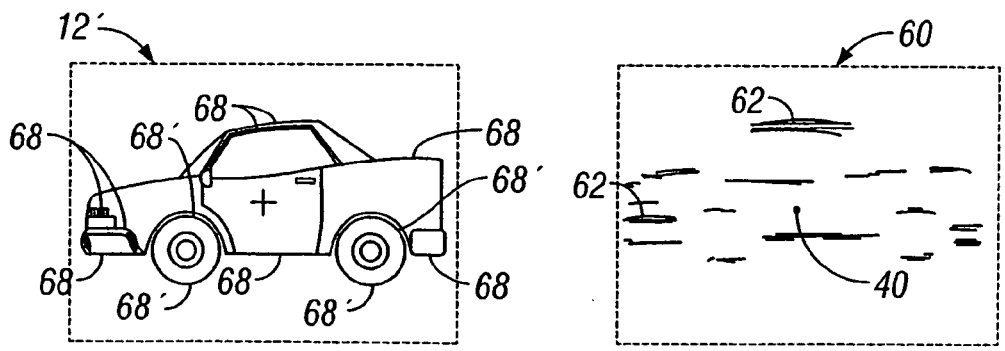
FIG. 13B  FIG. 13C

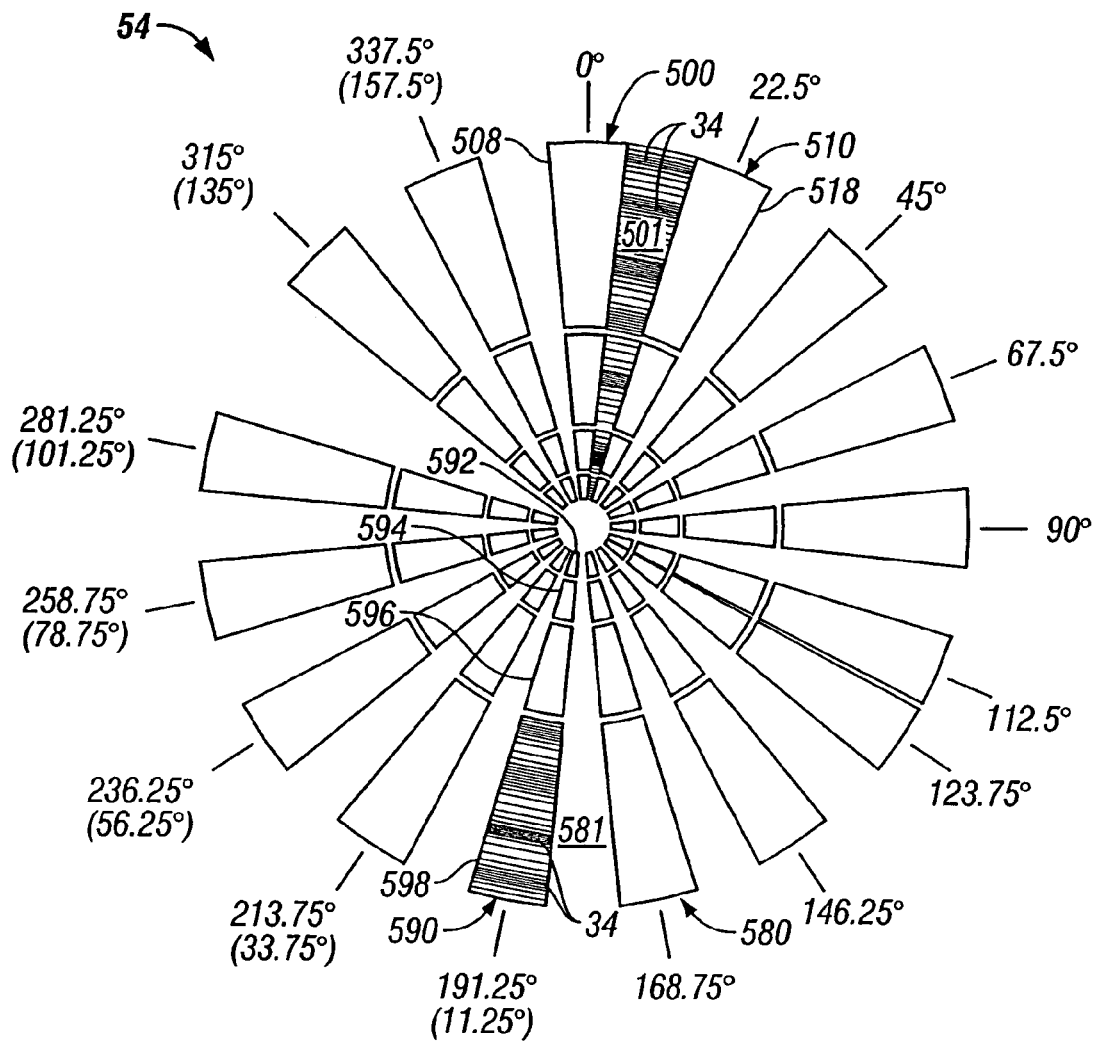
FIG. 14A
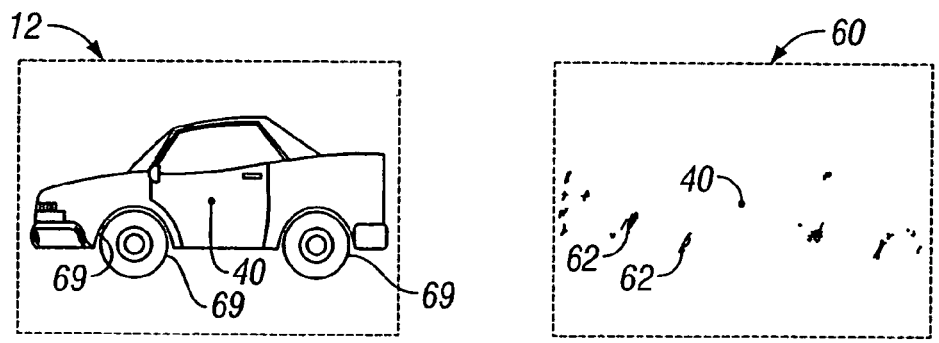
FIG. 14B  FIG. 14C

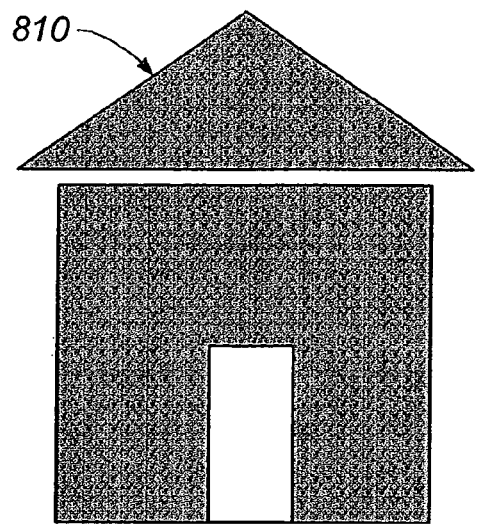
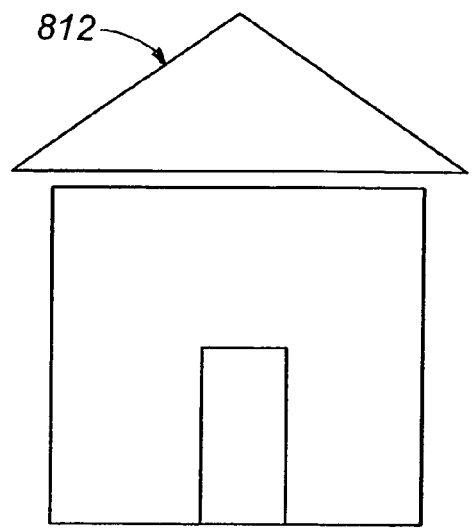
FIG. 19A FIG. 19B
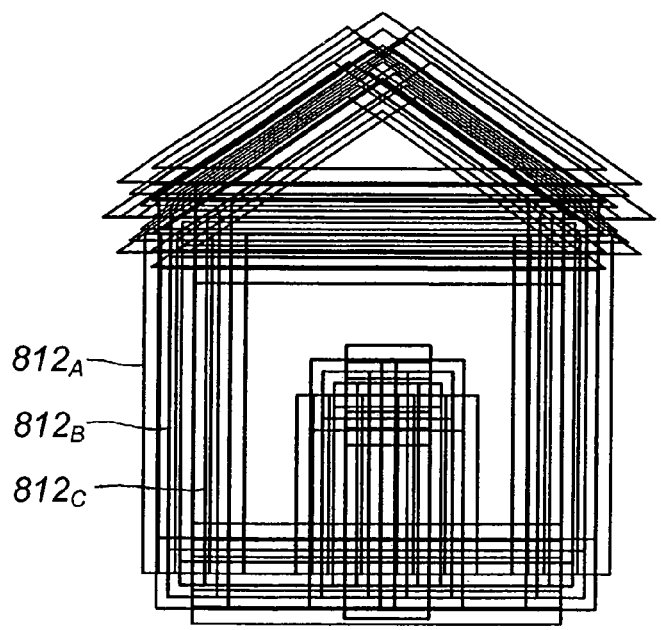
FIG. 19C

APPARATUS AND METHOD FOR RADIAL AND ANGULAR OR ROTATIONAL ANALYSIS OR IMAGES FOR SHAPE CONTENT AND MATCHING

CROSS REFERENCE TO RELATED PATENT APPLICATION

This patent application is a continuation-in-part of U.S. patent application Ser. No. 10/051,364, filed in the U.S. Patent and Trademark Office on Jan. 18, 2002 now abandoned, which is a continuation in-part of U.S. patent application Ser. No. 09/536,426, filed in the U.S. Patent and Trademark Office on Mar. 27, 2000 now U.S. Pat. No. 6,678,411.

BACKGROUND OF THE INVENTION

1. Field of the Invention

This invention relates generally to spatial light modulators and, more particularly, to a spatial light modulator with radially oriented active light modulating sectors for radial and angular analysis of beams of light, including Fourier transform optic patterns, for uses such as characterizing, searching, matching or identifying shape content of images.

2. State of the Prior Art

There are situations in which useful information can be derived from spatially dispersed portions of light beams. In particular, when an image is being carried or propagated by a light beam, it may be useful to gather and use or analyze information from a particular portion of the image, such as from a particular portion of a cross-section of a beam that is carrying an image.

For example, in my co-pending U.S. patent application, Ser. No. 09/536,426, which is incorporated herein by reference, narrow, radially oriented portions of a Fourier transform of an image are captured and detected in the spatial domain and used to characterize and encode images by shape for storage, searching, and retrieval. As explained therein, such radially oriented, angularly or rationally spaced portions of light energy from a Fourier transform, i.e., Fourier domain, of an image are captured sequentially in the spatial domain by positioning a rotating, opaque mask or wheel with a radially oriented slit in the Fourier transform domain of a light beam carrying the image after passing the light beam through a Fourier transform lens and detecting the light in the spatial domain that passes through the slit at various angular orientations, i.e., degrees of rotation. The light energy detected in the spatial domain that is passed through the slit in the Fourier domain at each angular orientation is characteristic of the portions of the image content that are generally linearly aligned in the same angular orientation as the slit in the rotating mask when the light energy is detected.

That system with the rotating, radially oriented, slit does perform the task of characterizing and encoding images by shape content of the images quite well and quite efficiently. However, it still has several shortcomings. For example, resolution of spatial frequency of an image at each angular orientation of the rotating slit is not as good as some applications or uses of such a system might require. Also, the spinning mask or wheel with an associated drive mechanism, like all mechanical devices, has stability and long term reliability issues, not to mention size and weight requirements.

SUMMARY OF THE INVENTION

Accordingly, it is a general object of this invention to provide an improved apparatus and method for capturing and recording optical information from portions of optical images.

A more specific object of this invention is to provide an improved apparatus and method for spatial analysis of Fourier transform optical patterns of images for shape content of such images.

Another specific object of this invention is to provide an improved apparatus and method for characterizing and encoding images by shape content for storing, searching, comparing, matching, or identifying images.

This and other objects, advantages, and novel features of the invention shall be set forth in part in the description that follows, and in part will become apparent to those skilled in the art upon examination of the following description or may be learned by the practice of the invention. The objects and the advantages may be realized and attained by means of the instrumentalities and in combinations particularly pointed out in the appended claims.

To further achieve the foregoing objects, the apparatus of this invention includes a spatial light modulator with a plurality of addressable, active optic elements that extend radially at various angular orientations in relation to an axis. The active optic elements are preferably shaped to modulate portions of light beams incident on discrete sectors of an active optic area on which the beam of light can be focused. Therefore, active optic modulators in the shape of individual sectors, i.e., essentially wedge-shaped, are preferred, although other shapes are also feasible and, in special circumstances, possibly even more desirable, such as rectangular for better resolution or curved for detection of curved shape content of an image. For better resolution of spatial frequency of shape content, the radially extending wedges or rectangles of the active optic area can be comprised of individually addressable segments, which can be activated separately or in groups, depending on the resolution desires. Wedge-shaped sectors can comprise segments of smaller, truncated wedge-shaped active optic elements or groups of sensors in pixel arrays that, in composite, form such shapes. Rectangular areas can also comprise smaller rectangular segments or composited groups of sensors in pixel arrays to form such radially extending, angularly spaced, active optic components or areas. For shape content characterization of an image, an optic pattern that is a Fourier transform of the image is focused on the active optic area, and radially disposed portions of the Fourier transform optic pattern at various angular orientations are selected and isolated by the spatial light modulator and projected into the spatial domain for detection of shape content of the image that is aligned with such angular orientations. The intensities of light detected from such respective portions are characteristic of such shape content, including brightness, sharpness, orientation, and density or spatial frequency of image features, and can be recorded, stored, or used to compare with similarly analyzed shape content of other images to find and identify matches or near matches of images with such shape content. Optional image pre-processing to add ghost images at various radial and angular relationships to the image and at various light intensities can enhance detectability of shape content and can enable near matching of images with similar shape content.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIGS. 11a–c include diagrammatic, elevation views similar to FIGS. 10a–c, but illustrating a use of a near inner segment of the vertical sector;

FIGS. 13a–c include diagrammatic, elevation views similar to FIGS. 10a–c, but illustrating a use of the outer segment of the horizontal oriented active optic sector;

FIGS. 14a–c include diagrammatic, elevation views similar to FIGS. 10a–c, but illustrating a use of the outer segment of the active optic sector that is oriented 191.25 degrees from vertical;

FIGS. 19a–c illustrate the ghosting technique of FIGS. 18a–c applied to a slightly more complex image.

DETAILED DESCRIPTION OF THE PREFERRED EMBODIMENTS

Figure 1:
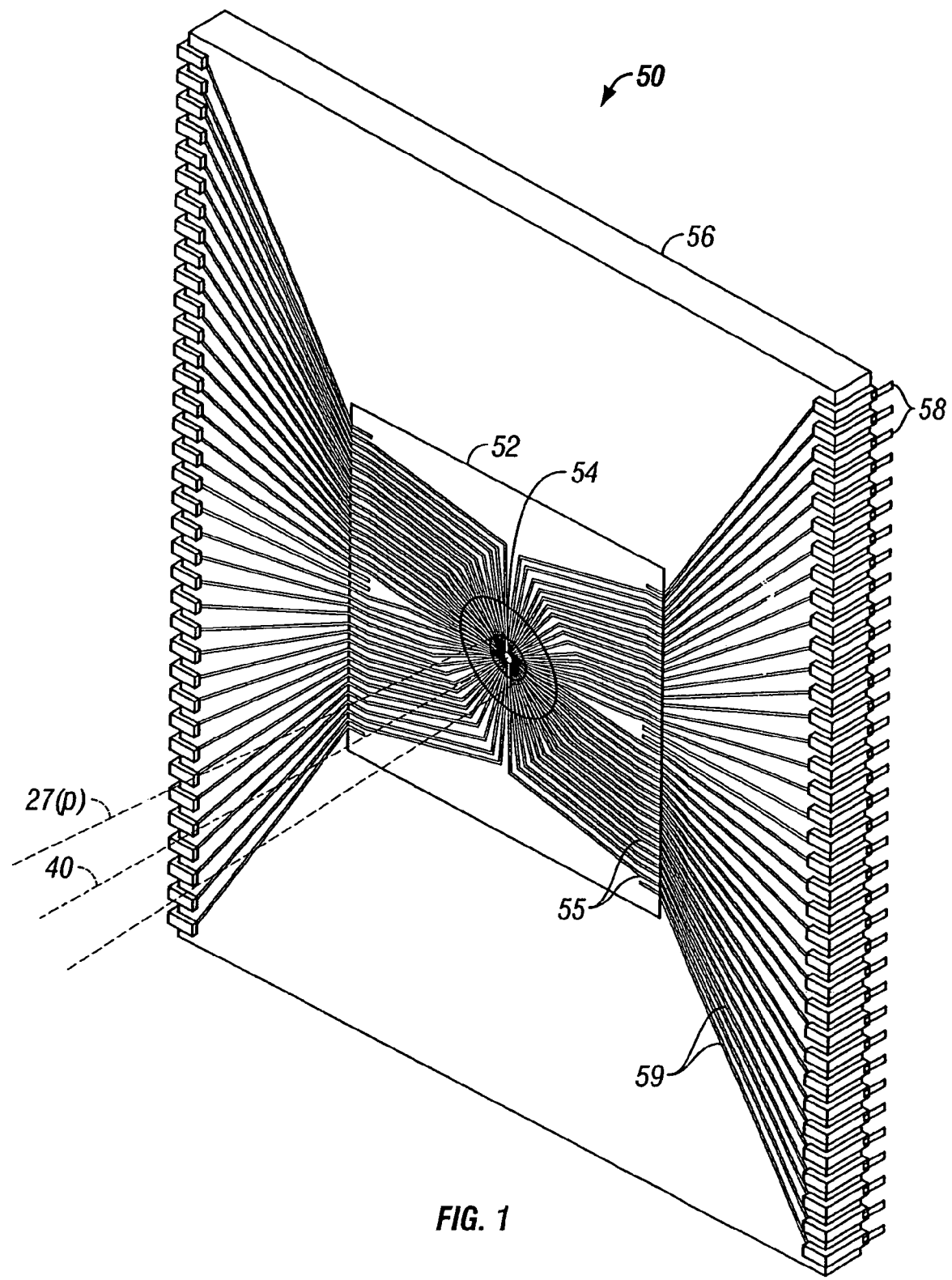
FIG. 1 is an isometric view of a segmented radial spatial light modulation device according to this invention illustrated with a beam of light focused on the light modulating components in the active optic area of the device.

A segmented radial spatial light modulator (SLM) device 50 according to the present invention is illustrated diagrammatically in FIG. 1 with a beam of light 27($p$) focused on the active optic area 54 in the center portion of the segmented radial SLM device 50. As illustrated diagrammatically in FIG. 1, the segmented radial SLM device 50 is preferably, but not necessarily, constructed as an integrated circuit 52 mounted on a chip 56 equipped with a plurality of electrical pins 58 configured to be plugged into a correspondingly configured receptacle (not shown) on a printed circuit board (not shown). In such a preferred embodiment, the pins 58 are connected electrically by a plurality of wires 59 soldered to contact pads 55 of the integrated circuit 52 to enable addressing and operating optic components in the active optic area 54, as will be discussed in more detail below.

Figure 2:
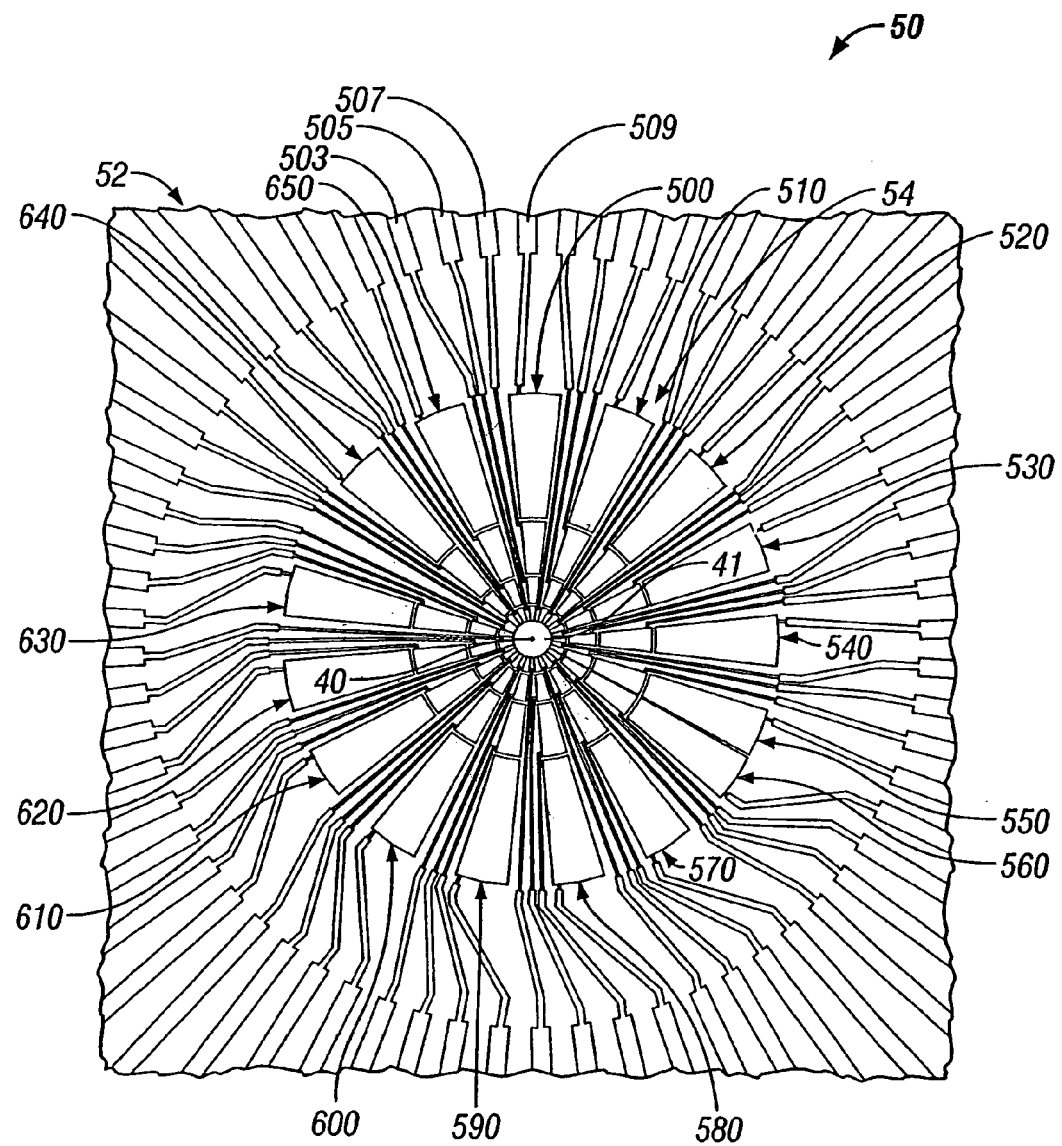
FIG. 2 is a front elevation view of the preferred light modulating components in the active optic area of the segmented radial spatial light modulator device of this invention in the shape of segmented modulator sectors that are oriented to extend radially at various angular orientations in relation to a central axis.
Figure 3:
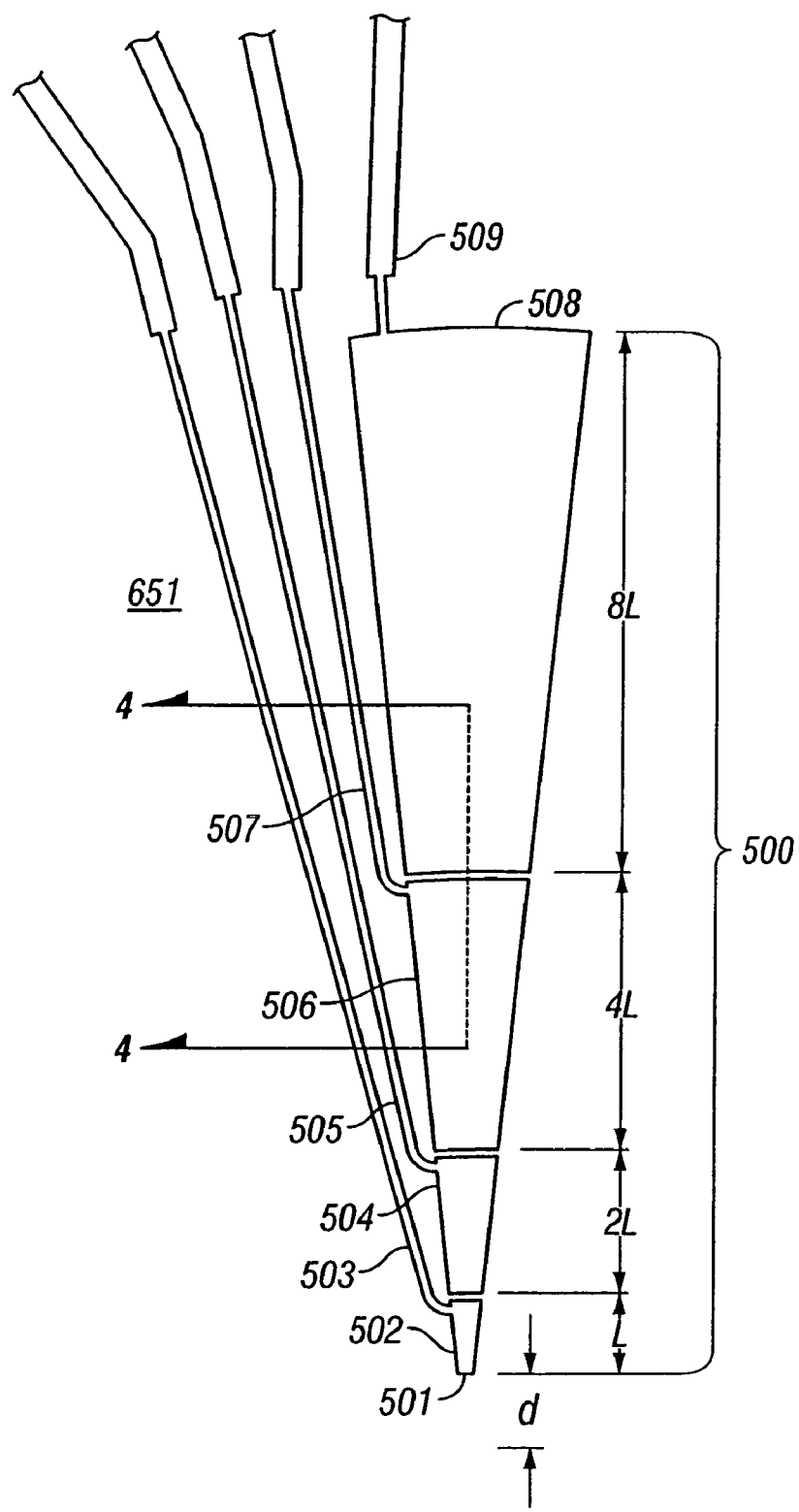
FIG. 3 is an enlarged, front elevation view of one sector of the active, light modulating components of the segmented radial spatial light modulator device.

An enlarged elevation view of the active optic area 54 of the integrated circuit 52 is illustrated in FIG. 2, and an even more enlarged view of the active optic segments 502, 504, 506, 508 of one modulator sector 500 (sometimes hereinafter "sector" for convenience) of the active optic area 54 is illustrated in FIG. 3. Essentially, the segmented radial SLM device 50 is capable of selectively isolating radially disposed portions of the incident light energy at various angular orientations in relation to a central axis 40 for detection, as will be explained in more detail below. One way of accomplishing such isolation is by reflecting, as well as rotating plane of polarization of, the selected radially disposed portions of the light beam 27($p$) that is incident on the active optic area 54, while other portions of the light beam 27($p$) are reflected, but without rotation of the plane of polarization, or vice versa. In the preferred embodiment, each of the active optic segments, such as segments 502, 504, 506, 508 of sector 500 in FIG. 3, are addressable individually through electrically conductive traces 503, 505, 507, 509, respectively, although the invention also can be implemented, albeit with less spatial frequency or scale resolution, by a sector 500 comprising only one active optic modulator or by activating one or more of the individual segments simultaneously.

Figure 4:
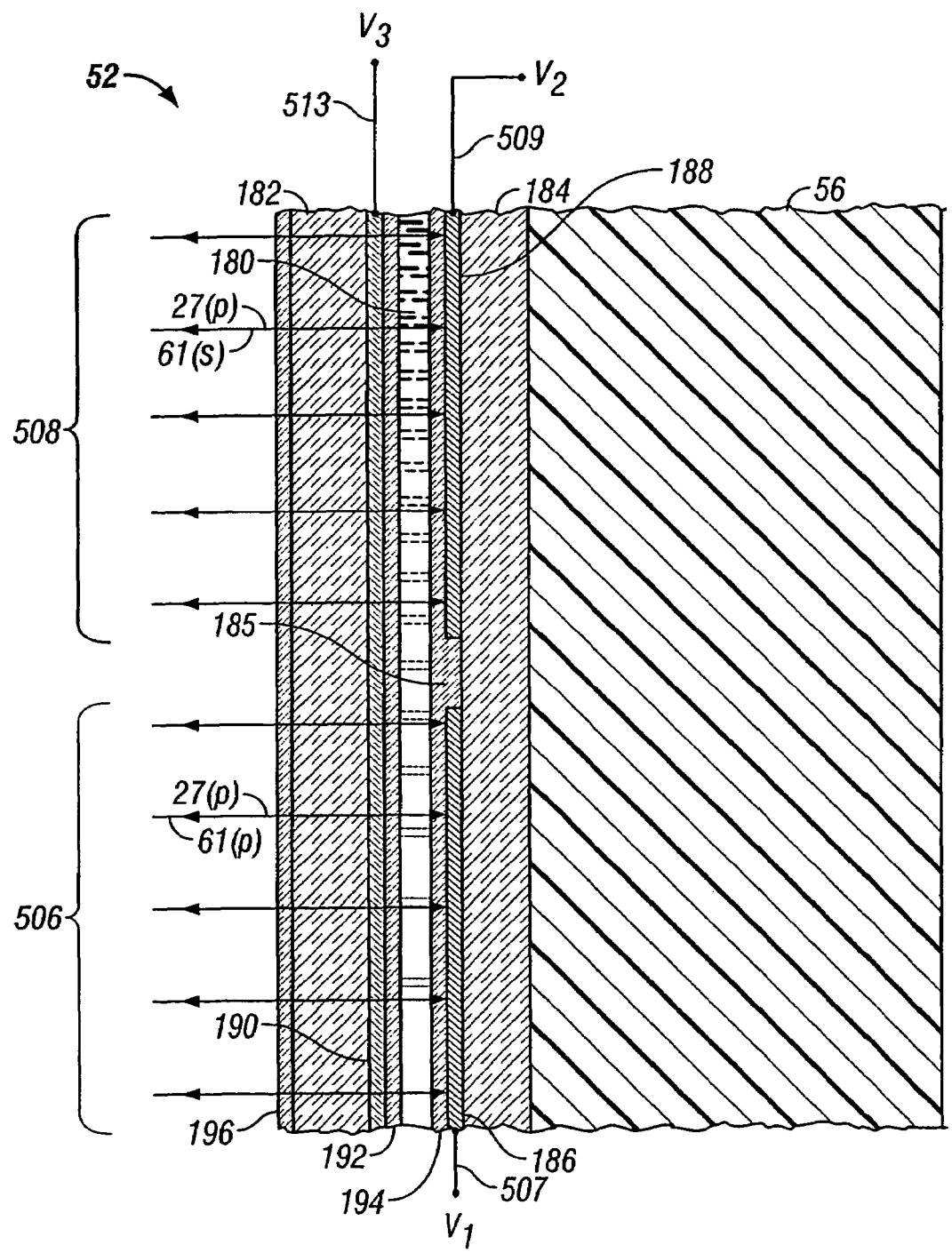
FIG. 4 is a cross-sectional view of a portion of an active optic sector of a segmented radial spatial light modulator of the present invention taken substantially along section line 4—4 of FIG. 3.

The selection and isolation of a portion of the incident light beam 27(p) is illustrated in FIG. 4, which is a partial cross-section of active optic segments 506, 508. An incident light beam 27(p), which is designated, for examples as being p-polarized, i.e., polarized in the p-plane, will be reflected by, and will emerge from, segment 508 as s-polarized light 27(s), i.e., light polarized in the s-plane, or vice versa, when the segment 508 is activated by a voltage V on trace 509, while the unactivated segment 506 reflects, but does not rotate plane of polarization of, the incident light 27(p). In FIG. 4, the light reflected by the activated segment 508 is designated as 61(s) to indicate its s-plane polarization, while light reflected by the non-activated segment 506 is designated as 61(p) to indicate its p-plane polarization. The structure and function of the segments 506, 508, which are typical of all the segments of all the sectors 500, 510, 520, 530, 540, 550, 560, 570, 580, 590, 600, 610, 620, 630, 640, 650 of the active optic area 54, will be explained in more detail below. Suffice it to say at this point that a s-polarization plane is orthogonal to, i.e., rotated 90° in relation to, a p-polarization plane and that such rotation of plane of polarization of a portion of an incident light beam 27 or vice versa, (p) (see FIGS. 1 and 4) to s-polarization 61(s) (see FIG. 4), while simultaneously leaving other portions of the incident beam 27(p) unrotated in the reflection 61(p), enables filtration or separation of that portion 61(s) from the remainder of the light beam 61(p), or vice versa, as will be explained in more detail below. Of course, as mentioned above, incident beam 27 could be s-polarized, and the device 52 could rotate a portion of such an incident beam to p-polarization to enable filtration or separation. Such alternatives are all readily understood by persons skilled in the art as effective equivalents, and this invention does not require or prefer one of such alternatives over others. Therefore, for simplicity, one or several of such alternatives will be explained and claimed for this invention, but with the understanding that such inverses or alternatives are implicit, thus covered by such explanation and claims.

Figure 5:
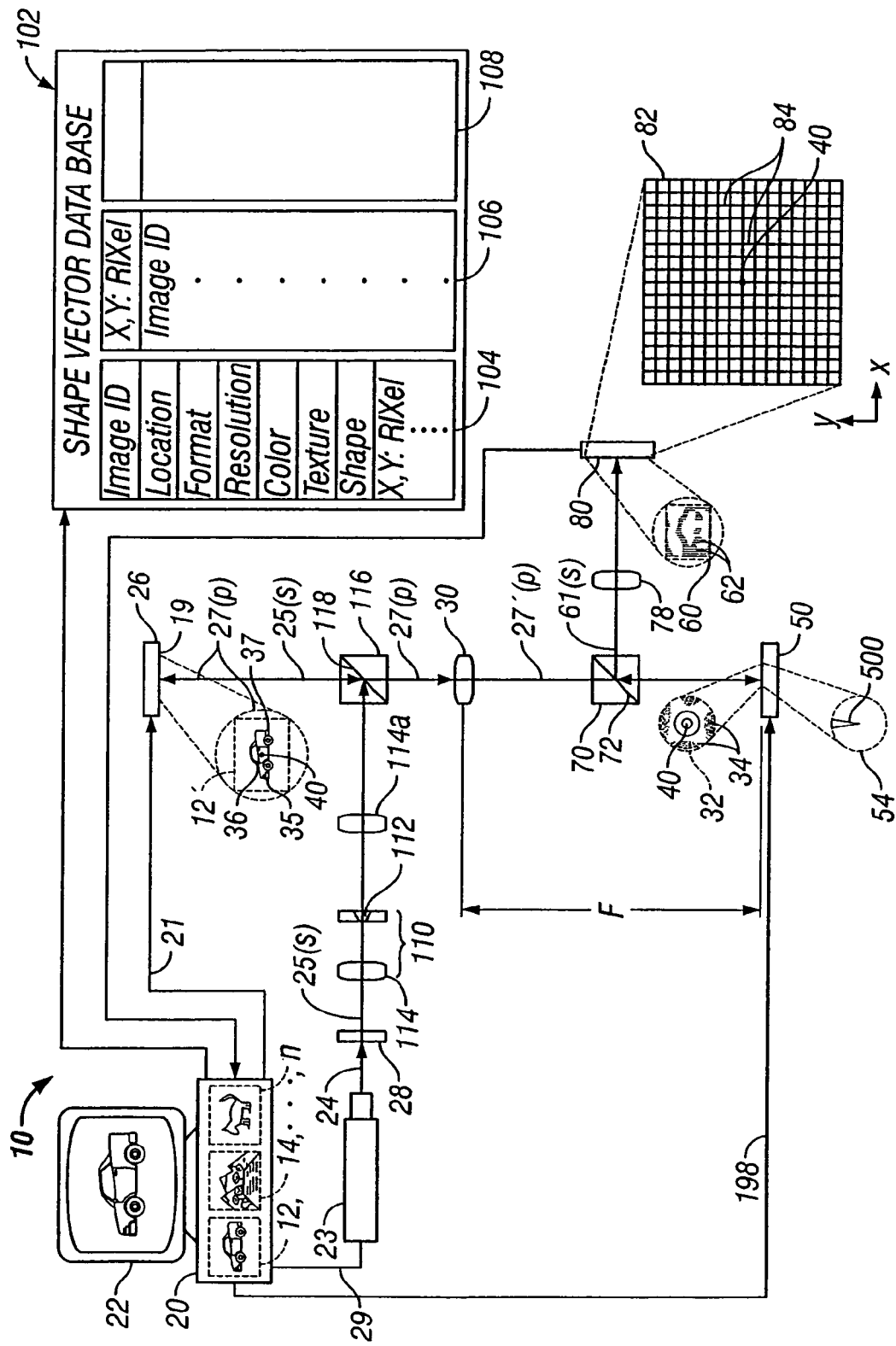
FIG. 5 is a schematic diagram of an optical image characterizer in which a segmented radial optical analyzer device according to this invention is illustrated in an application for characterizing and encoding optical images by shape content to exemplify its structure and functional capabilities.

The system 10 for characterizing, encoding, and storing images by shape content of such images, as illustrated diagrammatically in FIG. 5, is an example application of the segmented radial SLM device 50 described above and is a part of this invention. In this system 10, any number n of images 12, 14, . . . , n, can be characterized and encoded by the shape content in such images, and such encoded shape information about each image can be stored, for example, in database 102 for subsequent searching, retrieval, and comparison to shape content of other images that is characterized and encoded in the same manner.

The images 12, 14, . . . , n can be in virtually any form, for example, visual images on photographs, films, drawings, graphics, arbitrary patterns, ordered patterns, or the like. They can also be stored and/or generated in or from digital formats or analog formats. Such images can have content that is meaningful in some manner when viewed by humans, or they can appear to be meaningless or not capable of being interrupted by humans but characteristic of some other content, e.g., music, sounds, text, software, and the like. Essentially, any optic pattern of light energy intensities that can be manifested or displayed with discernable shape content can be characterized and encoded with this system 10.

A sample image 12, which can be obtained from any source (e.g., Internet, electronic data base, web site, library, scanner, photograph, film strip, radar image, electronic still or moving video camera, and other sources) is entered into the optical image shape characterizer 10, as will be described in more detail below. Any number n of other sample images 14, . . . , n, are shown in FIG. 5 queued for entry in sequence into the optical image characterizer 10. Entry of any number n of such sequential images 12, 14, . . . , n can be done manually or, preferably, in an automated manner, such as a mechanical slide handler, a computer image generator, a film strip projector, an electronic still or video camera, a hologram, or the like. The computer 20 in FIG. 5 is a preferred embodiment, but is also intended to be symbolic of any apparatus or system that is capable of queuing and moving images 12, 14, . . . , n into the image characterizer 10. The example image 12 of an automobile displayed on the video monitor 22 represents and is symbolic of any image that is placed in a process mode for characterizing and encoding its shape content according to this invention, although it should be understood that such display of the image being processed is not an essential feature of this invention. The description that follows will, for the most part, refer only to the first image 12 for convenience and simplicity, but with the understanding that it could apply as well to any image 12, 14, . . . , n, etc.

In the embodiment of the system 10 illustrated in FIG. 5, the image 12 is inserted into the optical image characterizer 10 in an image plane 19 that is perpendicular to the beam of light 27 emanating from the E-SLM 26, i.e., perpendicular to the plane of the view in FIG. 5. However, to facilitate explanation, illustration, and understanding of the invention, the images 12, 14, . . . , n are also shown in phantom lines in the plane of the view in FIG. 5, i.e., in the plane of the paper. This same convention is also used to project image 12' produced by the E-SLM 26, the Fourier transform optic pattern 32, the active optic area 54, isolated and filtered optic pattern 60, and the detector grid 82 from their respective planes perpendicular to the light beams into the plane of the paper for purposes of explanation, illustration, and understanding. These components and their functions in the invention will be explained in more detail below.

As mentioned above, the image 12 can be entered into the optical image characterizer 10 by the computer 20 and E-SLM 26, as will be described in more detail below. However, the image 12 will undergo a significant transformation upon passing through the thin, positive lens 30, also called the Fourier transform (FT) lens. A Fourier transform (FT) of the sample image 12' rearranges the light energy of the optic pattern of image 12' into a Fourier transform (FT) optic pattern 32, which is unique to the image 12', even though it is not recognizable as the image 12' to the human eye and brain, and which can be characterized by intensities, i.e., amplitudes, of light energy distributed spatially across the optic pattern 32. The complex amplitude distribution of light energy 34 in the optic pattern 32 is the Fourier transform of the complex light distribution in the image 12'. Image 12' is a recreation of the image 12 in monochromatic, preferably coherent, light energy, as will be described in more detail below, although white light will also work. Of course, persons skilled in the art will also recognize that an E-SLM is only one of a number of well-known devices that can create the image 12' in monochromatic or white light, and this invention is not limited to this particular example.

Concentrations of intense light energy in the Fourier transform (FT) optic pattern 32 generally correspond to spatial frequencies of the image 12', i.e., how closely together or far apart features in the image 12' change or remain the same. In other words, spatial frequencies are also manifested by how closely together or far apart light energy intensities across the light beam 27 change or remain the same. For example, a shirt with a plaid fabric in an image (not shown), i.e., having many small squares, would have a higher spatial frequency, i.e., changes per unit of distance, than a plain, single-color shirt (not shown) in the image. Likewise, portions of an image, such as the bumper and grill parts 35 of the automobile in image 12', would have a higher spatial frequency than the side panel 36 portion of the automobile image 12', because the bumper and grill parts 35 comprise many small pieces with various edges, curves, and other intricate changes within a small spatial distance, whereas the side panel 36 is fairly smooth and uniform over a large spatial distance. Light energy from the finer and sharper details of an image (more spatial frequency), such as the more intricate bumper and grill parts 35 of the image 12', tend to be dispersed farther radially outward from the optical center or axis 40 in the Fourier transformed image than light energy from more course or plain details of an image (less spatial frequency), such as the side panel 36 of the image 12'. The amplitude of light energy 34 dispersed radially outward in the Fourier transform optic pattern 32 is related to the light energy of the corresponding portions of the optic pattern of image 12' from which such light energy emanates, except that such light energy is concentrated into areas or bands 34 at the plane of the Fourier transform (FT) optic pattern 32 after they are refracted by the FT lens 30, i.e., into bands of intense light energy separated by bands of little or no light energy, which result from constructive and destructive interference of the diffracted light energy. If the high spatial frequency portions of the image 12', such as the bumper and grill portion 35, are bright, then the intensity or amplitude of light energy from those high spatial frequency portions of the image 12', which are dispersed by the FT lens 30 to the more radially outward bands of light energy 34 in the Fourier transform optic pattern 32, will be higher, i.e., brighter. On the other hand, if the high spatial frequency portions of the optic pattern of image 12' are dim, then the intensity or amplitude of light energy from those high spatial frequency portions of the optic pattern of image 12', which are dispersed by the FT lens 30 to the more radially outward bands of light energy 34 in the Fourier transform optic pattern 32, will be lower, i.e., not so bright. Likewise, if the low spatial frequency portions of the optic pattern of image 12', such as the side panel portion 36, are bright, then the intensity or amplitude of light energy from those low spatial frequency portions of the optic pattern of image 12' which are dispersed by the FT lens to the less radially outward bands of light energy 34 in the Fourier transform optic pattern 32 (i.e., closer to the optical axis 40), will be higher, i.e., brighter. However, if the low spatial frequency portions of the optic pattern of image 12' are dim, then the intensity or amplitude of light energy from those low spatial frequency portions of the optic pattern of image 12', which are dispersed by the FT lens 30 to the less radially outward bands of light energy 34 in the Fourier transform optic pattern 32, will be lower, i.e., not so bright.

In summary, the Fourier transform optic pattern 32 of the light emanating from the image 12': (i) is unique to the image 12'; (ii) comprises areas or bands of light energy 34 concentration, which are dispersed radially from the center or optical axis 40, that represent spatial frequencies, i.e., fineness of details, in the image 12'; (iii) the intensity or amplitudes of light energy 34 at each spatial frequency area or band in the Fourier transform optic pattern 32 corresponds to brightness or intensity of light energy emanating from the respective fine or course features of the image 12'; and (iv) such light energy 34 in the areas or bands of the Fourier transform optic pattern 32 are detectable in intensity and in spatial location by this invention.

Since this optical image characterizer 10 of this invention is designed to characterize an image 12 by shapes that comprise the image 12, additional spatial filtering of the Fourier transform light energy pattern 32 is used to detect and capture light energy emanating from the finer or sharper details or parts of such finer or sharper details in the image 12', which are aligned linearly in various specific angular orientations. Such spatial filtering can be accomplished in any of a number of different ways, as will be explained in more detail below, but an exemplary spatial filter arrangement for this function is included in a combination of the segmented radial spatial light modulator device 50 with the polarizing beam splitter 70. Essentially, the segmented radial SLM device 50 rotates the plane of polarization of selected portions of the Fourier transform optic pattern 32 from p-plane polarization to s-plane polarization, or vice versa, as explained above, and the polarizing beam splitter 70 separates light energy of those portions that is isolated and polarized in one plane from the light energy of the rest of the Fourier transform optic pattern 32 that remains polarized in the other plane so that such light energy of the selected and isolated portions can be detected separately.

In the example, segmented radial SLM 50 shown in FIGS. 1–4 only the portions of the light energy 34 in the Fourier transform pattern 32 that align linearly with selected active optic segments, for example, segment 502, 504, 506, and/or 508 (FIG. 3), have the plane of polarization rotated in the reflected light 61($s$) by the segmented radial SLM 50. In this example, such selected portions 61($s$) of the beam 27($p$) represent, i.e., emanated largely from, details or features of the image 12', such as straight lines and short segments of curved lines, that align linearly with the angular orientation of the respective sectors 500, 510, 520, 530, 540, 550, 560, 570, 580, 590, 600, 610, 620, 630, 640, 650 in which selected segments are located in the active optic area 54 of the segmented radial SLM 50. For example, if one or more of the segments 502, 504, 506, 508 in sector 500 is selected and activated to rotate plane of polarization of light energy reflected from such segments(s), the reflected light energy 61($s$) will have emanated largely from details or features of the image 12' that align linearly with the vertical orientation of the sector 500 in which segments 502, 504, 506, 508 are positioned. Further, since the light energy 34 from higher spatial frequency content of the image 12', e.g., closely spaced bumper and grill parts 35, are dispersed farther radially outward in the Fourier transform optic pattern 32 than light energy 34 from lower spatial frequency content, e.g., side panel 36, the light energy in reflected light beam 61($s$) will also be characteristic of a confined range of such spatial frequency content of image 12', depending on which segment of a sector is selected. For example, activation of outer segment 508 of sector 500 (FIG. 3), which is positioned farther radially outward from the optic axis 40 of the incident beam 27($p$) than segment 502, will cause the light energy in reflected beam 61($s$) to be characteristic of higher spatial frequency content of vertically oriented features in image 12', e.g., vertical edges of bumper and grill parts 35. In contrast, activation of inner segment 502 of sector 500, will cause the light energy in reflected beam 61($s$) to be more characteristic lower spatial frequency content of vertically oriented features in the image 12', e.g., the vertical rear edge of the trunk lid 37. The result is a filtered pattern 60 of light energy bands 62 that represent or are characteristic of the unique combination of features or lines in the content of image 12' that corresponds to light energy of the FT optic pattern 32 at the radial distance of the selected segment, sometimes called "scale", and that align linearly with the sector in which the selected segment is positioned. Therefore, in addition to being able to provide rotational spatial filtering of the FT optic pattern 32 at different angular orientations about the optic axis, the segments of each sector, such as segments 502, 504, 506, 508 of sector 500, provided the additional capability of scalar spatial filtering FT optic pattern 32 at different radial distances from the optic axis.

Of course, segments in different sectors of different angular orientations about the optic axis 40 will align linearly with features or lines in the image 12' that have different angular orientations, as will be described in more detail below. Thus, the light energy bands 62 in the filtered pattern 60 will change, as active optic segments in different sectors are selected and activated, to represent different features, details, edges, or lines in the optical pattern of image 12' at various angular orientations, intricateness or fineness, and brightness, as will be explained in more detail below. In general, however, the light energy bands 62, if inverse Fourier transformed from the FT optic pattern 32 after the above-described spatial filtering 54, will be located in the same spatially-related sites as the features in the original image 12' from which such light energy emanated. For example, light energy in a band 62 in pattern 60 that originally emanated from bumper and grill parts 35 in image 12', after spatial filtering with the vertical sector of the bumper and grill parts 35 in image 12'.

The spatially filtered light energy in bands 62 of the filtered pattern 60 can be detected by a photodetector 80 at any of the various angular orientations of the activated sectors and fed electronically to a computer 20 or other microprocessor or computer for processing and encoding. While only one photodetector 80 with an example 16×16 array 82 of individual photosensitive energy transducers 84 is illustrated in FIG. 5 and is sufficient for many purposes of this invention, other detector arrangements, for example, the two offset detector arrays described in co-pending patent application, Ser. No. 09/536,426, or one or more larger detector arrays, could also be used.

The computer 20, with input of information about the filtered optical patterns 60, i.e., light energy intensity (I) distribution, from the detector array 82, along with information about the image 12 (e.g., identification number, source locator, and the like), information about the angular orientation (R) of the sector in which a segment is activated, and information about the radial distance or scale (S) of the activated segment relating to spatial frequency, can be programmed to encode the characteristics of the image 12 relating to the shape content of the image 12. One useful format for encoding such information is by pixel of the filtered image 60, including information regarding x, y coordinate location of each pixel, Rotation (i.e., angular orientation of the sector in which a segment is activated, thus of the linear features of the image 12 that align with such angular orientation), and Intensity (i.e., amplitude of light energy from the filtered pattern 60 that is detected at each pixel at the angular orientation R. A searchable flag, such as a distortion factor X, can also be provided, as explained in more detail co-pending patent application, Ser. No. 09/536, 426 or by the ghost image pre-processing feature of this invention, which will be explained in more detail below. Such combination of angular orientation or rotation R, light energy intensity I for each pixel, and distortion factor X can be called a "RIXel" for short. Scale (i.e., spatial frequencies of image 12 content at such angular orientations) can also be included in such encoding, if desired. When including a scale factor S, the combination can be called a "RIXSel". Each RIXel or RIXSel can then be associated with some identifier for the image 12 from which it was derived (e.g., a number, name, or the like), the source location of the image 12 (e.g., Internet URL, data base file, book title, owner of the image 12, and the like), and any other desired information about the image, such as format, resolution, color, texture, content description, search category, or the like. Some of such other information, such as color, texture, content description, and/or search category, can be information input from another data base, from human input, or even from another optical characterizer that automatically characterizes the same image 12 as to color, texture, or the like—whatever would be useful for searching, finding, or retrieving image 12 or for comparing image 12 to other images.

Some, all, or additional combinations of such information about each image 12, 14 . . . , n characterized for shape and encoded, as described above, can be sent by the computer 20 to one or more data base(s) 102. Several example data base architectures 104, 106, 108 for storing RIXel or RIXSel information about each image 12, 14, . . . , n are shown in FIG. 5, but many other architectures and combinations of information could also be used.

In the optical image characterizer 10 illustrated in FIG. 5, the image 12 has to be recreated with monochromatic, preferably coherent, or white, light energy, e.g., at image 12'. For example, a monochromatic image 12' can be recreated with a spatial light modulator (SLM) 26 illuminated with a beam of monochromatic light 24 from a light source 23, such as a laser diode or gas diode. This feature of the invention could also be implemented with white light, although the resultant Fourier transform optic patterns and spatially filtered optic patterns would be more blurred than with monochromatic light. Therefore, while this description of the invention will proceed based on monochromatic, preferably coherent, light, it should be understood that white light is a suitable, albeit not a preferred, substitute. The spatial light modulator (SLM) 26 can be optically addressable (O-SLM), such as the one illustrated in co-pending patent application Ser. No. 09/536,426, or it can be electrically addressable (E-SLM) and driven, for example, by a computer 20 in FIG. 5 or by a video camera (not shown). As is known by persons skilled in the art, a spatial light modulator (SLM) can "write" an image into a polarized beam of light 25 by rotating or partially rotating the polarization plane of the light on a spatial basis across the beam 25 so that, upon reflection as beam 27, it is either transmitted through, or reflected by, the polarization beam splitter 116, depending on what is needed to create the image 12' in monochromatic light. In an optically addressed SLM (not shown), the image plane is addressed on a spatial basis by incident light energy on a semiconductor material adjacent the polarization rotating material (usually a liquid crystal material), whereas, in an electrically addressable SLM 26, the liquid crystal, polarization rotating material is addressed electrically on a pixel by pixel basis. The pixel portions of the polarized light that have the plane of polarization rotated 45 degrees as they pass once through the liquid crystal material, whereupon such light is reflected and passed back through the liquid crystal again, where it is rotated another 45 degrees. Thus, the pixels of light in polarized beam 25 that have their plane of polarization rotated in the SLM 26 are reflected and emerge from the SLM along the optical path 27, which has an optic axis 40 that coincides with the optic axis of the incident beam 25 but in an optic pattern imposed by the E-SLM 26 that forms an image 12' and with its plane of polarization rotated 90 degrees from the plane of polarization of the incident beam 25. The remaining pixels of light, which do not undergo rotation of the plane of polarization, are also reflected, but they can be separated from those that have undergone rotation of plane of polarization, as will be explained below. Various light intensities or brightnesses of the image 12 can be recreated in gray scales in image 12' by partial rotations of plane of polarization. Persons skilled in the art may also be able to create the image 12' holographically or with other devices or systems, and this invention is not limited by any particular apparatus or method of creating image 12'.

In the FIG. 5 example embodiment, the coherent light beam 24 from laser source 23 is passed first through a polarizer 28 to create a polarized beam of coherent light 25 with all the light polarized in one plane, such as, for example, but not for limitation, in the s-plane, as indicated by 25($s$). The s-polarized beam 25($s$) is then passed through a spatial filter 110 comprised essentially of a pin hole 112 and a lens 114 to focus the beam 25($s$) on the pin hole 112. This spatial filter 110 is provided primarily to condition the beam 25($s$) to get a good Gaussian wavefront and, if necessary, to limit the power of the beam 25($s$). Lens 114$a$ then columnates the light. Of course, the initial beam 25 could be p-polarized, instead of s-polarized to implement this invention with inverses of the example planes of polarization illustrated in FIG. 5 and described herein, which would work just as well.

The beam 25($s$) is then passed through a polarizing beam splitter 116, which reflects light polarized in one direction at plane 118 and transmits light polarized in the orthogonal direction. In this example, the polarizing beam splitter 116 reflects s-polarized light and transmits p-polarized light, and it is oriented to reflect the s-polarized beam 25($s$) toward the electrically addressed spatial light modulator (E-SLM) 16. The monochromatic, preferably coherent, light beam 25($s$) incident on the E-SLM 36 provides the light energy that is utilized to carry the shape content of the image 12' for further analysis, characterization, and encoding according to the principles of this invention in the examples described below.

As mentioned above, there are many ways of "writing" images 12, 14, . . . , n into a light beam, one of which is with an E-SLM 16. In this example, computer 20 has the content of image 12 digitized, so the computer 20 can transmit digital signals via link 21 to the E-SLM 26 in a manner that addresses and activates certain pixels in the E-SLM 26 to "write" the image 12' into reflected light beam 27($p$), as is understood by persons skilled in the art. Essentially, the addressed pixels rotate the plane of polarization by 90 degrees from the s-plane of incident beam 25($s$) to the p-plane of reflected beam 27($p$), or by some lesser amount for gray-scales, in a manner such that the reflected light energy with partially or fully 90-degree polarization plane rotation is in a monochromatic optical pattern of the image 12'. Of course, persons skilled in the art will also understand that the image 12' could also be created with an E-SLM that operates in an opposite manner, i.e., the plane of polarization is rotated in reflected light, except where pixels are activated, in which case the computer 20 would be programmed to activate pixels according to a negative of the image 12 in order to write the image 12' into reflected beam 27. Either way, the emerging beam 27($p$) of coherent light, carrying image 12', is p-polarized instead of s-polarized or vice versa. Consequently, in the above example, the monochromatic light beam 27($p$), with its light energy distributed in an optic pattern that forms the monochromatic image 12', is transmitted by the polarizing beam splitter 116 to the FT lens 30, instead of being reflected by it.

The positive Fourier transform (FT) lens 30, as explained above is positioned in the light beam 27($p$) and redistributes the monochromatic light energy from the image 12' into its Fourier transform optic pattern 32, which occurs at the focal plane of the FT lens 30. Therefore, the segmented radial SLM 50 of this invention is shown positioned in the focal plane of the FT lens 30, as indicated by the focal distance F in FIG. 5, and the FT lens 30 is also positioned the same focal distance F from the E-SLM 26, so that the E-SLM 26 is also in a focal plane of the lens 30. As also explained above, the complex amplitude distribution of light energy 34 in the Fourier transform optic pattern 32 at the focal plane of the FT lens 30 is the Fourier transform of the complex amplitude distribution in the image 12'. The Fourier transform optic pattern 32 has all of the light energy from the image 12' distributed into the symmetrical pattern 32 based on the spatial frequencies of the image 12', with intensities of the light energy in the various spatial frequency distributions 34 based on the light energy in the corresponding portions of the image 12' where those respective spatial frequencies occur.

Of course, the Fourier transform optical pattern can also be projected and captured or spatially filtered according to this invention in locations other than the focal plane of the lens 30 by appropriate optical components or systems (not shown), as is well-known by persons skilled in the art. For example, but not for limitation, another lens (not shown) positioned behind the focal plane of the lens 30 can form and project an enlargement of the FT image in a different plane, as explained in the U.S. Pat. No. 3,771,124, issued to D. McMahon. Therefore, while the example implementation of this invention shown in FIG. 5 illustrates the segmented, radial SLM 50 positioned in the focal plane of the FT lens 30, it could be positioned in any plane where the Fourier transform optic pattern 32 occurs.

The Fourier transform optic pattern 32, as mentioned above, is symmetrical from top to bottom and from left to right, so that each semicircle of the Fourier transform optic pattern 32 contains exactly the same distribution and intensity of light energy as its opposite semicircle. Light energy from lower spatial frequencies in the image 12' are distributed toward the center or optical axis 40 of the Fourier transform optic pattern 32, while the light energy from higher spatial frequencies in the image 12' are distributed farther away from the optical axis 40 and toward the outer edge of the pattern 32, i.e., farther radially outward from the optic axis 40. Light energy from features in the image 12' that are distributed vertically in the image 12' to create those various spatial frequencies is likewise distributed vertically in the Fourier transform optic pattern 32. At the same time, light energy from features in the image 12' that are distributed horizontally in the image 12' to create those various spatial frequencies is distributed horizontally in the Fourier transform optic pattern 32. Therefore, in general, light energy from features in the image 12' that are distributed in any angular orientation with respect to the optical axis 40 to create the various spatial frequencies in the image 12' is also distributed at those same angular orientations in the Fourier transform optic pattern 32. Consequently, by detecting only light energy distributed at particular angular orientations with respect to the optical axis 40 in the Fourier transform optic pattern 32, such detections are characteristic of features or details in the image 12' that are aligned linearly in such particular angular orientations. The radial distributions of such detected light energy at each such angular orientation indicate the intricateness or sharpness of such linear features or details in the image 12', i.e., spatial frequency, while the intensities of such detected light energy indicate the brightness of such features or details in the image 12'.

Therefore, a composite of light energy detections at all angular orientations in the Fourier transform optic pattern 32 creates a composite record of the shapes, i.e., angular orientations, intricateness or sharpness, and brightness, of linear features that comprise the image 12'. However, for most practical needs, such as for encoding shape characteristics of images 12, 14, . . . , n for data base storing, searching, retrieval, comparison and matching to other images, and the like, it is not necessary to record such light energy detections for all angular orientations in the Fourier transform pattern 12'. It is usually sufficient to detect and record such light energy distributions and intensities for just some of the angular orientations in the Fourier transform optic pattern 32 to get enough shape characterization to be practically unique to each image 12, 14, . . . , n for data base storage, searching, and retrieval of such specific images 12, 14, . . . , n. For purposes of explanation, but not for limitation, use of 11.25-degree angular increments is convenient and practical, because there are sixteen (16) 11.25-degree increments in 180 degrees of rotation, which is sufficient characterization for most purposes and has data processing and data storage efficiencies, as explained in co-pending U.S. patent application Ser. No. 09/536,426. However, other discrete angular increments could also be used, including constant increments or varying increments. Of course, varying increments would require more computer capacity and more complex software to handle the data processing, storing, and searching functions.

In the preferred embodiment of this invention, the segmented radial SLM 50, shown in FIG. 1, with its active optic sectors 500, 510, 520, 530, 540, 550, 560, 570, 580, 590, 600, 610, 620, 630, 640, 650 shown in FIG. 2, is used to select only light energy from specific angular orientations in the Fourier transform optic pattern 32 for detection at any instant in time or increment of time on the detector array 82. As explained above with reference to the sector 500 in FIG. 3, which, except for angular orientation, is typical of all the other sectors 510, 520, 530, 540, 550, 560, 570, 580, 590, 600, 610, 620, 630, 640, 650 in FIG. 2, any active optic segment, e.g., segments 502, 504, 506, 508, in vertical sector 500, can be addressed via respective electric traces, e.g., traces 503, 505, 507, 509 for sector 500, so that the detector array 82 can detect light energy distribution and intensity (I) in the Fourier transform optic pattern 32 at any angular orientation (R) of a sector 500, 510, 520, 530, 540, 550, 560, 570, 580, 590, 600, 610, 620, 630, 640, 650 and at selected radial distances from the optic axis 40. For example, sector 500 is oriented substantially vertical in relation to the optic axis 40. If all of the active optic segments 502, 504, 506, 508 of sector 500 are selected and activated simultaneously, virtually all of the light energy that is distributed vertically in the Fourier transform optic pattern 32 will be incident on, and detected by, the photodetector array 82 (FIG. 5). However, if only one of the active optic segments, for example, outer segment 508, is selected and activated, then only the light energy in the Fourier transform optic pattern 32 that is distributed vertically and the farthest radially outward from the optic axis 40 will be detected by the photodetector array 82. Thus, any one, all, or combination of the active optic segments, e.g., 502, 504, 506, 508, can be activated sequentially or simultaneously to detect and record various distributions of light energy in the Fourier transform optic pattern 32. Also, any one or more sectors 500, 510, 520, 530, 540, 550, 560, 570, 580, 590, 600, 610, 620, 630, 640, 650 can be selected and activated sequentially, simultaneously, or in various combinations, depending on the detail or particular light energy distributions in the FT optic pattern 32 it is desired to detect.

The preferred, but not essential, shape of the active optic sectors, e.g., sector 500, in the segmented radial SLM 50 is a narrow, elongated wedge. The width of the wedge will depend on the light energy available or needed and the optic resolution desired. A wider sector will direct more light energy 34 to the detector 80, but precision of line or feature resolution of the image 12' will degrade slightly. A narrower sector will get better line resolution, but with a corresponding increase in the complexity of the resulting pattern shape generalization and complexity and a decrease in light energy directed to the detector 80. There may also be a practical limitation as to how narrow and close the wedges can be made with the connecting electric traces in a limited active optic area 54 in an economic and efficient manner. Therefore, a desirable balance between these resolution, detectability, and size considerations may be struck in choosing sector size. Also, for specialized applications, sectors of different shapes (not shown), such as ovals, or other shapes could be used to capture shapes other than lines from the image 12.

The number of active optic segments in a sector, e.g., the four segments 502, 504, 506, 508 in sector 500, also has similar constraints. Smaller segments direct less light energy to the detector 80, but may provide more resolution of shape characteristics of the image 12', whereas larger segments direct more light to the detector 80, thus are more easily detectable, but resolution decreases. For lower resolution applications or requirements, the sectors may not even need to be divided into segments, and this invention includes radial spatial light modulators in which each sector 500, 510, 520, 530, 540, 550, 560, 570, 580, 590, 600, 610, 620, 630, 640, 650 is not segmented, thus comprises a single active optic element for each sector. However, the same lower resolution effect can be achieved in the illustrated embodiment 50 in FIGS. 1–3 by activating all the segments 502, 504, 506, 508 in a sector simultaneously, as described above.

In the preferred embodiment 50, each sector, e.g., sector 500, comprises four individually addressable, active optic segments, e.g., segments 502, 504, 506, 508, as shown in FIG. 3, although any number of segments other than four can also be used according to this invention. The length of each successive radial outward segment in this example is twice as long as the next adjacent radially inward segment. Thus, in sector 500, the near inner segment 504 is about twice as long as the inner segment 502. Likewise, the near outer segment 506 is about twice as long as the near inner segment 504, and the outer segment 508 is about twice as long as the near outer segment 506. Expressed another way, if the radial length of inner segment 502 is L, the radial length of near inner segment 504 is 2L, the radial length of the near outer segment 506 is 4L, and the radial length of the outer segment 508 is 8L. The distance d between the optic axis 40 and the inner edge 501 of inner segment 502 is about the same as the length L of inner segment 502, so the diameter of the center area 57 is about 2L. These proportional lengths of the active optic segments enable the inner segments (e.g., 502) to capture shape features of the image 12' that have sizes (in spatial frequency) in a range of about 25–50 percent of the size of the image 12' produced by the spatial light modulator 26 in FIG. 5, the near inner segments (e.g., 504) to capture shape features of the image 12' that have sizes in a range of about 12½–25 percent of the size of image 12', the near outer segments (e.g., 506) to capture shape features of the image 12' that have sizes in a range of about 6¼–12½ percent of the size of image 12, and the outer segments (e.g., 508) to capture shape features of the image 12' that have sizes in a range of about 3⅛–6¼ percent of the size of the image 12'.

Figure 6A:
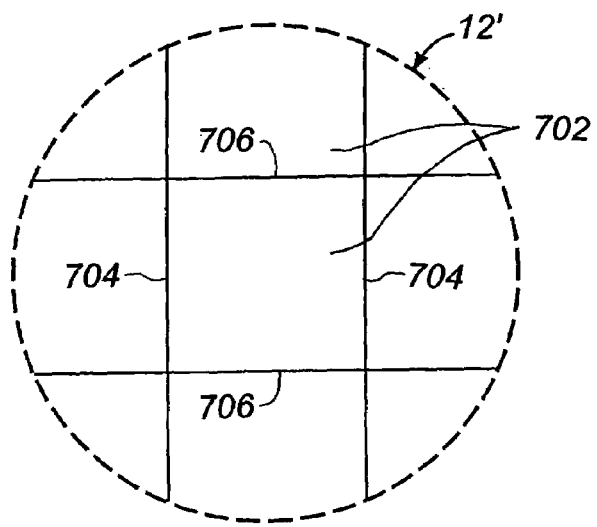
FIGS. 6a–c is an example spatial-domain image with large squares, which is optically filtered in the Fourier transform domain according to this invention to produce example spatial domain images of low spatial frequency vertical and horizontal shape content.
Figure 7A:
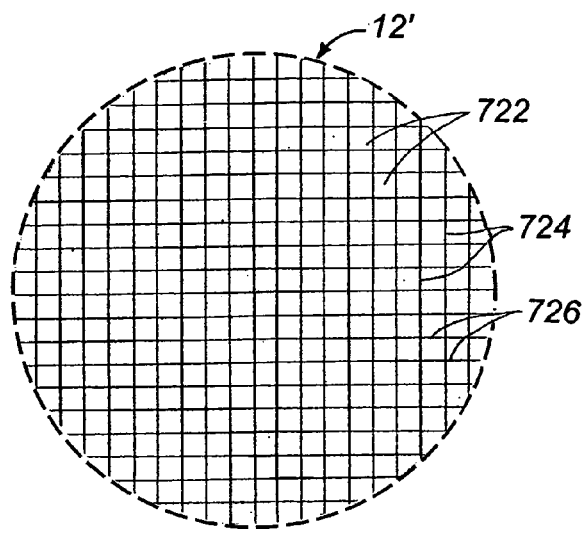
FIGS. 7a–c is an example spatial domain image with small squares, which is optically filtered in the Fourier transform domain according to this invention to produce example spatial domain images of high spatial frequency vertical and horizontal shape content.
Figure 7C:
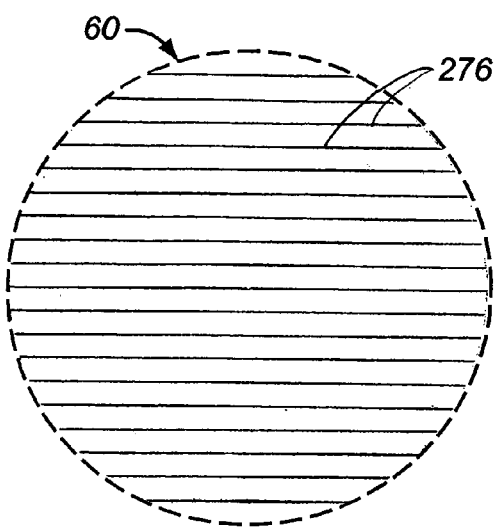
Figure 9:
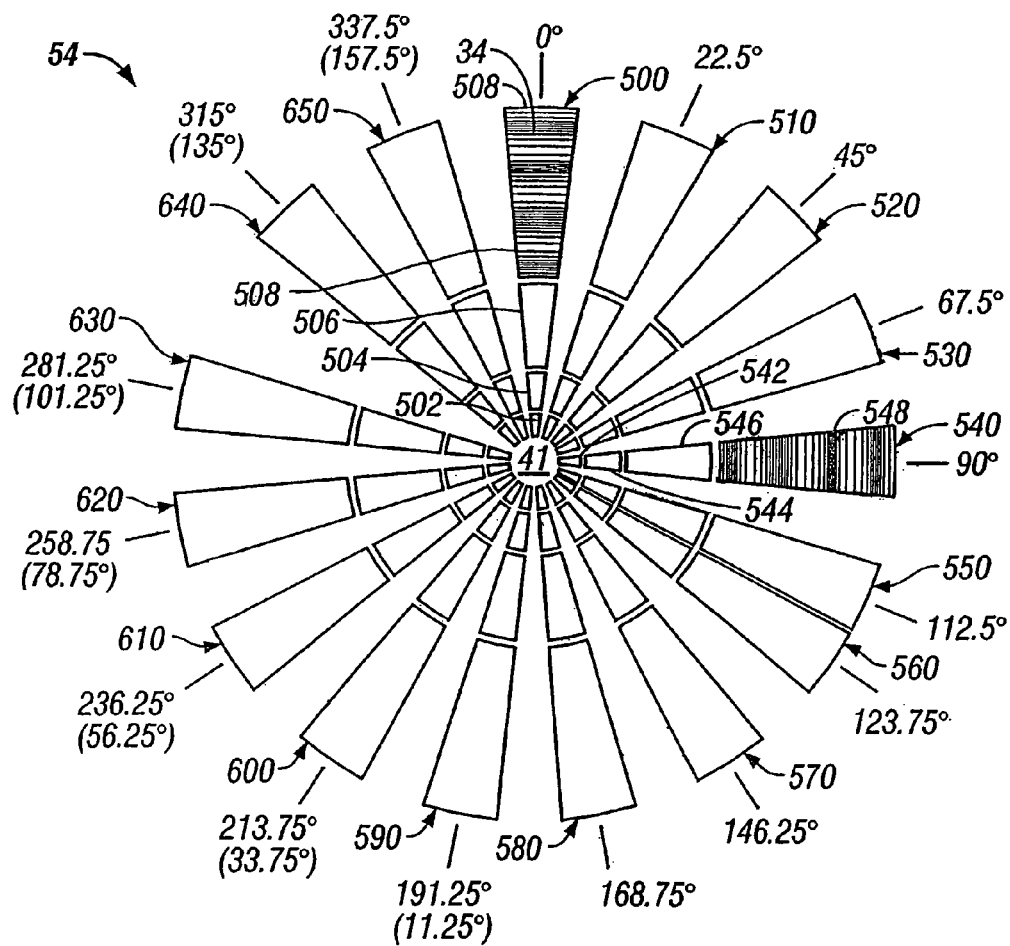
FIG. 9 illustrates the active optic segmented sectors of a preferred embodiment segmented radial spatial light modulator to facilitate explanation of the spatial optic filtering of the example images in FIGS. 6a–c and 7a–c.

To illustrate, suppose the image 12' is a pattern of a plurality of parallel vertical lines intersecting a plurality of parallel horizontal lines to form a matrix of squares, as illustrated, for example, in FIG. 6a or in FIG. 7a. If the squares comprising the matrix are quite large, such as the squares 702 in FIG. 6a, so that the vertical lines 704, 706, which define the edges of the squares 702, are spaced far apart from each other by a distance equal to about 25–50 percent of width of the whole image 12', i.e., low spatial frequency, then the light energy for that vertical shape content will be incident on the inner segment 502 of the vertical sector 500, as illustrated in FIG. 9. In contrast, if the squares of the matrix are quite small, such as the squares 722 in FIG. 7a, so that the vertical lines 724, which define the edges of the squares 722, are spaced closely together, such as by a distance equal to about 3⅛–6¼ percent of the width of the whole image 12', i.e., high spatial frequency, then the light energy for that vertical shape content will be incident on the outer segment 508 of the vertical sector 500, as illustrated in FIG. 9. It follows, then, that light energy for the vertical shape content of a matrix of intermediately sized squares (not shown) i.e., intermediate or moderate spatial frequency, would be incident on one or both of the intermediate segments 504, 506 of the vertical section 500.

Also, light energy for the horizontal shape content of such large, small, or intermediate sized matrix square patterns would be incident on the respective inner, outer, or intermediate positioned segments of the horizontal sector 540. For example, in the image 12' of FIG. 6a with the large squares 702, where the horizontal lines 706 are spaced apart by a distance equal to 25–50 percent of the width of the image 12', i.e., low spatial frequency, the light energy for that horizontal shape content will be incident on the inner segment 542 of the horizontal sector 540, as illustrated in FIG. 9. In contrast, the example image 12' of small squares 722 in FIG. 7a, wherein the horizontal lines 726 are spaced apart by a distance equal to 3⅛–6¼ percent of the width of the image 12', i.e., high spatial frequency, the light energy in the FT plane 32 for that horizontal shape content will be incident on the outer segment 548 of the horizontal sector 540, as illustrated in FIG. 9.

Further, any features of an image 12' that have sizes over 50 percent of the size of image 12', which light energy is incident on the center area portion 41, can either be captured and detected as an indicator of general brightness of the image 12' for intensity control or calibration purposes or just ignored and not captured or detected at all, because there is little, if any, useable shape information or content in the light energy that comprises that 50 percent of the size of the image 12'. Likewise, the approximately 3⅛ percent of the size content of the image 12' that is radially outward beyond the outer segments or sectors is not detected and can be ignored in this preferred configuration. The center 41 can be made optically active to capture light energy incident thereon, if it is desired to capture and detect such light energy for general brightness indication, intensity control, or calibration purposes, as will be understood and within the capabilities of persons skilled in the art, once they understand this invention. For example, if an image 12' has a matrix of squares, which are so large that the distance between the vertical lines, which define the edges of the large squares, is over 50 percent of the width of the image 12', there is little, if any, vertical shape content of practical use, and the light energy for that vertical shape content is incident on the center area portion 41. On the opposite end of the spectrum, if such an image 12' has a matrix of squares, which are so small that the distance between the vertical lines, which define the edges of the small squares, is less than about 3⅛ percent of the width of the image 12', there is also little, if any, vertical shape content of practical use, and the light energy for such vertical shape content is dispersed radially outward, beyond the outer segment 508 of sector 500. Of course, other configurations or scale segment sizes and combinations of the segmented radial SLM 50 could also be made and used within the scope of this invention.

Figure 6B:
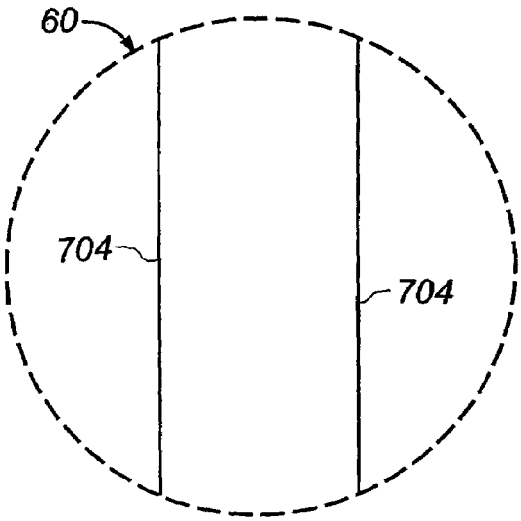
Figure 8:
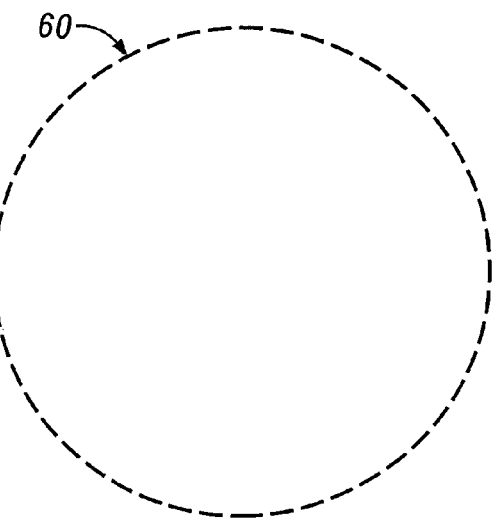
FIG. 8 illustrates a blank spatial domain image resulting from actuation of a segment or sector in the Fourier transform plane that has no incident light energy, this no shape content.

The shape content detection according to this invention will be described in more detail below by use of the example automobile image 12' of FIG. 5. However, it is helpful to understand at this point that, when the image 12' is a matrix of squares, as described above, and when the light energy incident on the vertical sector 500 in the Fourier transform plane 32 is projected back into a spatial domain image, such spatial domain image will have been filtered to show only the vertical lines at the boundaries of the squares. No horizontal lines would appear in such spatial domain, filtered image, because the light energy with the horizontal shape content would have been substantially blocked or filtered out of the image. Further, if the squares of the matrix pattern are large, such as the squares 702 in FIG. 6a described above, the vertical lines 704 of such large squares 702 would only be re-formed and visible in the spatial domain, if the light energy incident on the near center segment 502 of vertical sector 500 is actuated in a manner that does not block such incident light energy in the Fourier transform plane, but, instead, allows it to project back into the spatial domain. In other words, actuation of the inner segment 502 of vertical sector 500 would project that incident light energy back into the spatial domain to re-form the vertical line 704 portions of that large square 702 image, as illustrated in FIG. 6b. At the same time, actuating the outer segment 508 to pass and not block or filter out light would not project vertical lines to re-form in the spatial domain, because such low spatial frequency light energy from a pattern of such large squares 702 is not dispersed radially outward enough to be incident on such outer segment 508. Therefore, when there is a pattern of large squares 702 in the image 12', as illustrated in FIG. 6a, actuation of any segment of the vertical sector 500, other than the inner segment 502, would not result in the re-formed spatial image of the vertical lines 704 in FIG. 6b, but would instead result in a blank, i.e., no spatial image, as illustrated in FIG. 8.

Figure 7B:
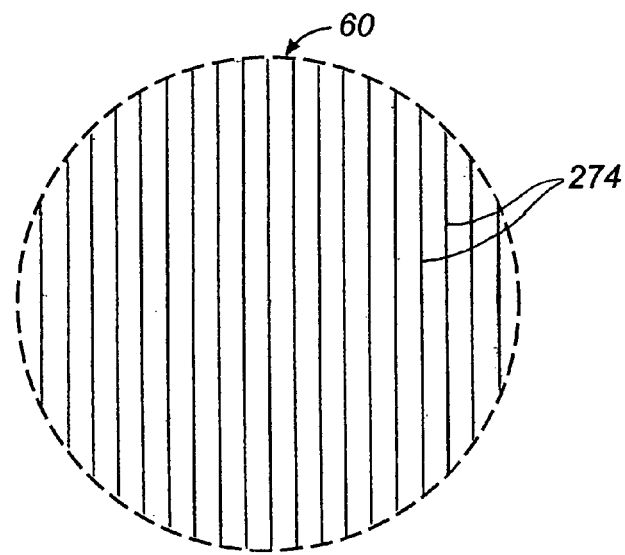

On the other hand, if the image 12' has a matrix of very small squares 722, thus high spatial frequency, as shown in FIG. 7a and described above, then the light energy in the FT plane 32 is dispersed farther radially outward to be incident on the outer segment 508 and not on the inner segment 502. Therefore, the outer segment 508 of vertical sector 500 would have to be actuated to project such light energy of the vertical lines 724 of FIG. 7a back into the spatial domain to display the vertical lines 724, as illustrated in FIG. 7b. Further, actuation of the inner segment 502 would not project such vertical lines 724 in the spatial domain, since there would be no light energy incident on such inner segment 502 in that case. Similar results for horizontal lines 706 of FIG. 6*a* and 726 of FIG. 7*a* would be obtained from the several segments 542, 548 of the horizontal sector 540, as illustrated in FIGS. 6*b* and 7*b*.

In summary, for an image 12' comprising a matrix of squares, as described above, actuation of the inner segment 502 of vertical sector 500 and getting vertical liens formed in the spatial domain, while actuation of the outer segment 508 as well as the intermediate segments 5604, 506, in the vertical sector 500 projects no vertical lines in the spatial domain, would show that the vertical shape content of the image has low spatial frequency characteristic of large squares 702 in FIG. 6*a*. Similar analysis with the horizontal sector 540 resulting in horizontal lines in the spatial domain from actuation of the inner segment 542, but not from actuation of the outer or intermediate segments 548, 546, 544, would show such horizontal lines 706 to also be low spatial frequency characteristic of large squares 702.

If analysis of other non-vertical and non-horizontal sectors 510, 520, 530, 550, 560, 580, 590, 600, 610, 620, 630, 640, 650 show no lines in the spatial domain from those angular orientations, then the recordable results confirm the shape content of the image 12' to be only a smaller or larger spatial frequency at some or all of those angular orientations, then the recordable results would confirm some shape complexity in addition to the matrix of squares in the image 12'. Thus, shape information, including spatial frequency or scale (S), and intensity (I) at each angular orientation or rotation (R) can be acquired with the spatial light modulator 50 in the system of this invention.

In summary, for an image 12' with the large square 702 matrix shown in FIG. 6*a*, the low spatial frequency vertical line 704 shape content of that image can only be projected from the FT plane 32 back into the spatial domain illustrated in FIG. 6*b* by actuation of the inner segment 502 of the vertical sector 500 in FIG. 9. Likewise, the low spatial frequency horizontal line 706 shape content of that large square matrix image can only be projected from the FT plane 32 back into the spatial domain illustrated in FIG. 6*c* by actuation of the inner segment 542 of horizontal sector 540. Actuation of any other segment of sectors 500, 510, 520, 530, 540, 550, 560, 570, 580, 590, 600, 610, 620, 630, 640 for that large square, low spatial frequency, image 12' of FIG. 6*a* will result only in a blank, as illustrated in FIG. 8, because, with that kind of low spatial frequency image 12' having only vertical and horizontal lines, there will be no light energy incident on such other segments. Actually, in practice, there could be some amount of spill-over of light energy incident on some of such other segments, since the optical components and even the physical systems, can seldom be perfect. However, in a simple square grid image, such as shown in FIGS. 6*a* and 7*a*, such spill-over of light energy to adjacent segments and/or sectors would not usually be significant. More complex shape content in images could very well cause light energy in the FT plane 32 to be incident on one or more adjacent segments and/or sectors at different rotational (R) and radial (S) positions, in which case the intensities (I) of light on any such adjacent segments and/or sectors would become part of the RIXSel information or shape data for such an image.

While the radial configuration of the active optic sectors with or without the multiple, active optic segments in each sector in the spatial light modulator 50 is a significant feature of this invention, persons skilled in the art of designing and fabricating spatial light modulators can readily understand how such a spatial light modulator 50 can be constructed and function, once they become familiar with the features and principles of this invention, and there are many known materials, fabrication techniques, and the like, known to persons skilled in the art that could be used to design, make, and use state-of-the-art spatial light modulators that are applicable to the specialized spatial light modulator embodiments of this invention. Therefore, a detailed recitation of such available materials is not necessary to enable a person skilled in the art to make and use this invention. Never-the-less, reference is now made to FIG. 4 in combination with FIGS. 1–3 and 5 to illustrate one example of how selection and activation of any particular active optic segment, for example, near outer segment 506 and outer segment 508, function to selectively enable detection of light energy from the Fourier transform optic pattern 32 that is incident on such segments.

As illustrated in FIG. 4, the optic active segments 506, 508, which are typical of other active optic segments, are part of an integrated circuit 52, which is mounted on a chip base or platform 56. The integrated circuit 52 has a variable birefringent material 180, such as a liquid crystal material, sandwiched between two transparent substrates 182, 184, such as high quality glass. The variable birefringent material 180 is responsive to a voltage to change its birefringence in the area of the voltage, which results in rotation of the plane of polarization of the light that passes through the material 180. The division between near outer segment 506 and outer segment 508 is made by a separation of respective metal layers 186, 188. An intervening dielectric or electrical insulation material 185 can be used to maintain electrical separation of these metal layers 186, 188. As shown by a combination of FIGS. 3 and 4, electrically conductive trace 507 is connected to the metal layer 186 of near outer segment 506, and trace 509 is connected to the metal layer 188 of outer segment 508. In fact, the electric traces 507, 509 and metal layers 186, 188 can be deposited on the same metal and can be on the back substrate 184 concurrently with their respective metal layers 186, 188 during fabrication of the integrated circuit 52, as would be understood and within the capabilities of persons skilled in the art of designing and fabricating spatial light modulators, once they are informed of the principles of this invention. Therefore, the metal layers 186, 188 can be addressed individually through their respective connected traces 507, 509 by connecting positive (+) or negative (−) voltages $V_1$ and $V_2$, respectively, to traces 507, 509.

A transparent conductive layer 190 deposited on the front substrate 182 is connected by another lead 513 to another voltage $V_3$. Therefore, a voltage can be applied across the portion of the liquid crystal material 180 that is sandwiched between the metal layer 186 and the transparent conductive layer 190 by, for example, making $V_1$ positive and $V_3$ negative and vice versa. Likewise, when a voltage can be applied across the portion of the liquid crystal material 180 that is sandwiched between the metal layer 188 and the transparent conductive layer 190 by, for example, making $V_2$ positive and $V_3$ negative and vice versa.

As mentioned above, the function of the respective segments 506, 508 is to rotate the plane of polarization of selective portions of the incident light beam 27(*p*) so that those portions of the light beam 27(*p*), which carry corresponding portions of the Fourier transform optic pattern 32, can be separated and isolated from the remainder of the light beam 27(*p*) for detection by the photodetector array 82 (FIG. 5). As understood by persons skilled in the art, there are a number of spatial light modulator variations, structures, and materials that can yield the desired functional results, some of which have advantages and/or disadvantages over others, such as switching speeds, light transmission efficiencies, costs, and the like, and many of which would be readily available and satisfactory for use in this invention. Therefore, for purposes of explanation, but not for limitation, the segmented radially spatial light modulator illustrated in FIG. 4 can have respective alignment layers 192, 194 deposited on the transparent conductive layer 190 on substrate 182 and on the metal layers 186, 188 on substrate 184. These alignment layers 192, 194 are brushed or polished in a direction desired for boundary layer crystal alignment, depending on the type of liquid crystal material 180 used, as is well-understood in the art. See, e.g., J. Goodman, "Introduction to Fourier Optics, $2^{nd}$ ed., chapter 7 (The McGraw Hill Companies, Inc.) 1996. An antireflective layer 196 can be deposited on the outside surface of the glass substrate 182 to maintain optical transmissive efficiency.

One example system, but certainly not the only one, can use a liquid crystal material 180 that transmits light 27(p) without affecting polarization when there is a sufficient voltage across the liquid crystal material 180 and to act as a ¼-wave retarder when there is no voltage across the liquid crystal material. An untwisted crystal material 180 that is birefringent in its untwisted state can function in this manner. Thus, for example, when no voltage is applied across the liquid crystal material 180 in segment 508, there is no molecular rotation of the liquid crystal material 180 in outer segment 508, and the liquid crystal material in outer segment 108, with the proper thickness according to the liquid crystal manufacturer's specifications, will function as a ¼-wave plate to convert p-polarized light 27(p) incident on outer segment 508 to circular polarization as the light passes through the untwisted liquid crystal material 180. Upon reaching the metal layer 188, which is reflective, the light is reflected and passes back through the liquid crystal material to undergo another ¼-wave retardation to convert the circular polarization to linear polarization, but in the s-plane, which is orthogonal to the p-plane. The reflected light 61(s), therefore, has its plane of polarization effectively rotated by 90 degrees in relation to the incident light 27(p).

Meanwhile, if there is a sufficient voltage on, for example, the near outer segment 506, to rotate the long axes of the liquid crystal molecules into alignment with the direction of propagation of the incident light waves 27(p), thereby eliminating the birefringence of the liquid crystal material 180, then there is no change of the linear polarization of the light on either its first pass through the liquid crystal material 180 or on its second pass through the liquid crystal material after being reflected by metal layer 186. Consequently, under this condition with a voltage applied across the liquid material 180 in near outer segment 506, the reflected light 61(p) is still polarized in the p-plane, i.e., the same plane as the incident light 27(p).

Many liquid crystal materials require an average DC voltage bias of zero, which can be provided by driving the voltage $V_3$ with a square wave function of alternating positive and negative voltages for equal times. Therefore, for no voltage across the liquid crystal material 180, the other voltages $V_1$, $V_2$, etc., can be driven in phase with equal voltages as $V_3$. However, to apply a voltage across the liquid crystal material 180 adjacent a particular metal layer 186, 188, etc., to activate that particular segment 506, 508, etc., as described above, the respective voltage $V_1$ or $V_2$, etc., can be driven out of phase with $V_3$. If the frequency of the square wave function is coordinated with the switching speed of the liquid crystal material 180, one-half cycle out of phase for a voltage $V_1$, $V_2$, etc., will be enough to activate the liquid crystal material 180 to rotate the plane of polarization of the light as described above.

As mentioned above, other alternate arrangements and known liquid crystal materials can reverse the results from an applied voltage. For example, a twisted liquid crystal material 180 may be used to rotate plane of polarization under a voltage and to not affect plane of polarization when there is no voltage.

Referring again primarily to FIG. 5 with continuing secondary reference to FIG. 4, the light energy in the beam 27'(p), which passes through the polarizing beam splitter 116 and 70 without reflection by planes 116 and 72, is focused as the Fourier transform optic pattern 32 on the segmented radial SLM 50. Selected active optic segments, for example, segments 502, 504, 506, 508, in the segmented radial SLM, can rotate the plane of polarization of portions of the incident light beam 27(p), as described above, in order to separate and isolate light energy from selected portions of the FT optic pattern 32 for detection by photodetector 80. The computer 20 can be programmed to provide signals via link 198 to the segmented radial SLM 50 to select and coordinate activation of particular segments, for example, segments 502, 504, 506, 508, with displays of particular images 12, 14, . . . , n. The computer 20 can also be programmed to coordinate laser source 23 via a link 29 to produce the required light energy 24, when the selected segment of the segmented radial SLM 50 is activated.

The reflected light 61(s) from the segmented radial SLM 50, e.g., light polarized in the s-plane reflected from an activated segment, as explained above, does not pass back through the polarizing beam splitter 70 along with p-polarized reflected light. Instead, the s-polarized reflected light 61(s) is reflected by the plane 72 in the polarizing beam splitter 70 to the detector 80 in the spatial domain. The lens 78 magnifies and focuses the isolated beam 61(s) in a desired size in the spatial domain on the detector array 82 of photodetector 80.

The photodetector array 82, as mentioned above, can be a 16×16 array of individual light sensors 84, such as charge coupled devices (CCDs), as shown in FIG. 5, or any of a variety of other sizes and configurations. The x, y coordinates of individual sensors 84 in the array 82 that detect light 61(s) can be communicated, along with light intensity (I) information, to the computer 20 or other controller or recording device via a link 86, where it can be associated with information bout the image 12, 14, . . . , n and the angular orientation (R) and/or radial position (S) of the activated segment(s) in the segmented radial SLM 50 that provided the beam 61(s) to the detector 80.

Figure 10A:
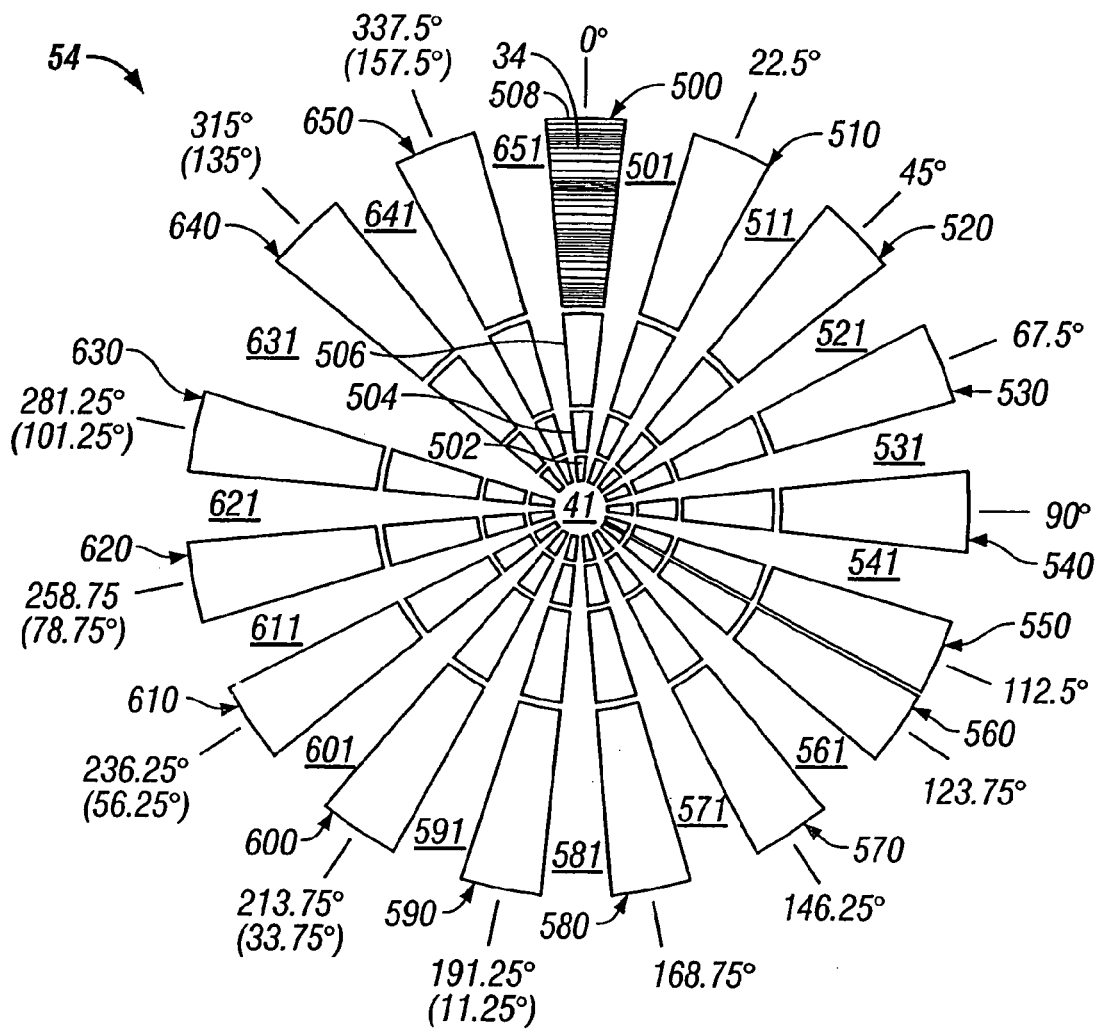
FIGS 10a–c include diagrammatic, elevation view of the active light modulating components of the segmented radial spatial light modulator device to illustrate a use of an outer segment of a vertically oriented sector of the light modulation components of the segmented radial spatial light modulator device of this invention along with diagrammatic views of an image being characterized and a resulting detectable optic pattern that is characteristic of some of the vertically oriented shape content of the image.

The spatial filtering process described above and its characterization of the image 12 by shape content is illustrated in more detail in FIGS. 10a–c, 11a–c, 12a–c, 13a–c, and 14a–c. With reference first to FIG. 10a, the active optic area 54 from FIGS. 1 and 2 is shown in FIG. 10a with the example sectors 500, 510, 520, 530, 540, 550, 560, 570, 580, 590, 600, 610, 620, 630, 640, 650, but, to avoid unnecessary clutter, without the electric traces that were described above and shown in FIGS. 1–3. As mentioned above, the sectors can be any desired width or any desired angular orientation, but a convenient, efficient, and effective configuration is to provide sectors of 11.25°. For example, a circle of 360° divides into 32 sectors of 11.25° each, and a semicircle of 180° divides into sixteen sectors of 11.25° each. Further, as mentioned above, the light energy distribution in any semicircle of a Fourier transform optic pattern 32 is symmetric with its opposite semicircle. Therefore, in accordance with this symmetry principle, detection of the light energy pattern in one semicircle of the FT optic pattern 32, for example, in the semicircle extending from 0° to 180°, provides effective information for the entire image 12', and detection of the light energy pattern in the opposite semicircle extending from 180° to 360° provides the same information. Consequently, to alleviate clutter and better accommodate the electric traces (shown in FIGS. 1–3, some of sectors can be positioned in one semi-circle of the optic area 54 with intervening spaces to accommodate the electric traces (shown in FIGS. 1–3), while others of the sectors can be positioned in the opposite semicircle of the optic area 54 diametrically opposite to the intervening spaces. For example, when the circle is divided into 32 sectors of 11.25° each, only 16 of those sectors, such as sectors 500, 510, 520, 530, 540, 550, 560, 570, 580, 590, 600, 610, 620, 630, 640, 650 have to be optically active to detect all of the shape content in the light energy incident on the area 54. All 16 of such optically active sectors could be positioned in one semicircle of the area 54, or, as explained above, it is more convenient and less cluttered to position some of the optically active sectors in one semicircle with intervening spaces and others in the opposite semicircle diametrically opposite to the intervening spaces. In the example of FIG. 10a, any eight of the sectors, e.g., sectors 640, 650, 500, 510, 520, 530, 540, 550, separated by non-active areas 641, 651, 501, 511, 521, 531, 541, are positioned in one semicircle of the area 54, while the remaining eight of the sectors 560, 570, 580, 590, 600, 610, 620, 630, also separated by non-active areas 561, 571, 581, 591, 601, 611, 621, can be positioned in the opposite semicircle, as shown in FIG. 10a. When each of the 16 active optic sectors 500, 510, 520, 530, 540, 550, 560, 570, 580, 590, 600, 610, 620, 630, 640, 650 in this arrangement is positioned diametrically opposite a non-active area, the symmetry of the FT optic pattern 32 (FIG. 5) effectively allows all of the shape content in the light energy distribution in FT optic pattern 32 to be detected with these sectors—bit including, of course, the light energy incident on the center area portion 41 or that is dispersed radially outward beyond the outer segments, which has little, if any, significant shape content, as explained above.

This principle also facilitates design and fabrication of an effective segmented radial SLM 50, because, for every active optic sector, there can be an adjacent inactive sector or area available for placement of electrically conductive traces to the segments, as shown by reference back to FIGS. 2 and 3. For example, the inactive area 651 between active optic segments 500 and 650 accommodates placement of traces 503, 505, and 507 (shown in FIG. 3) to respective segments 502, 504, 506 of active optic sector 500. To provide active optic sectors to detect light energy incident on the non-active areas, for example, the non-active area 501 in FIG. 10a between active optic sectors 500, 510, the above-described symmetry principle is applied by providing an active optic sector 590 in a position diametrically opposite the said non-active area 501. Therefore, detection of light energy detected in the active optic sector 590 is effectively detecting light energy incident on the non-active area 501 between sectors 500, 510. In order to have an active optic sector positioned diametrically opposite a non-active area, two of the active optic sectors, e.g., sectors 550, 560 are positioned adjacent each other without any significant intervening non-active area, so the diametrically opposite non-active area 631 is twice as big as other non-active areas. Therefore, according to the above-described symmetry principle, substantially all shape content in the light energy 34 of FT optic pattern 32 (FIG. 5) is detectable by the sixteen 11.25° active optic sectors 500, 510, 520, 530, 540, 550, 560, 570, 580, 590, 600, 610,620, 630, 640, 650.

Returning now to FIG. 10a, vertical angular orientation is arbitrarily designated as 0°, so horizontal angular orientation is at 90°. Each active optic sector 500, 510, 520, 530, 540, 550, 560, 570, 580, 590, 600, 610, 620, 630, 640, 650 is about 11.25°. Active optic sectors from sector 640 clockwise to sector 550 are each separated by respective non-active areas 641, 651, 501, 511, 521,531, 541 of 11.25°. Therefore, each active optic sector from sector 560 clockwise to sector 630 is positioned diametrically opposite a respective non-active area 561, 571, 581, 591, 601, 611, 621. Consequently, substantially all the shape content in the light energy distribution in the FT optic pattern 32 (FIG. 4) incident on the active area 54 can be detected in 11.25° intervals by the 11.25° sectors 500, 510, 520, 503, 504, 550, 560, 570, 580, 590, 600, 610, 620, 630, 640, 650 positioned as described above.

For example, shape content in the light energy characteristic of that incident on both the vertical 11.25° sector 500 centered at 0° as well as on the non-active area 581 centered at 180° can be detected by effectively activating the active optical segments 502, 504, 506, 508 of sector 500. Shape content in the light energy characteristic of that incident on the 11.25° sector 590 centered at 191.25° as well as on the non-active area 501 centered at 11.25° can be detected effectively by activating the active optic segments of sector 590, because the active optic sector 590 is centered diametrically opposite the non-active area of 11.25°. Shape content in the light energy characteristic of that incident on either the 11.25° sector 510 centered at 22.5° or the non-active area 591 centered at 202.5° can be detected by activating the active optic segments of sector 510. Shape content in the light energy characteristic of that incident on either the 11.25° non-active area centered at 33.75° or active sector 600 centered at 213.75° can be detected by activating the active optic segments of sector 600, which is centered diametrically opposite 33.75° at 213.75°. Shape content in the light energy characteristic of that incident on either the 11.25° sector 520 centered at 45° or non-active area 601 centered at 225° can be detected by activating the active optic segments of sector 520. Shape content in the light energy characteristic of that incident on either the 11.25° non-active area 521 centered at 56.25° or the active sector 610 centered at 236.25° can be detected by activating the active optic segments of sector 610, which is centered diametrically opposite 56.25° at 256.25°. Shape content in the light energy characteristic of that incident on either the 11.25° sector 530 centered at 67.5° or the non-active area 611 centered at 247.5° can be detected by activating the active optic segments of sector 530. Shape content in the light energy characteristic of that incident on either the 11.25° non-active area 531 centered at 78.75° or active sector 620 centered at 258.75° can be detected by activating the active optic segments of sector 620, which is centered diametrically opposite 78.75° at 258.75°. Shape content in the light energy characteristic of that incident on either the 11.25° sector 540 centered at 90° or non-active area 621 centered at 270° can be detected by activating the active optic segments of sector 540. Shape content in the light energy characteristic of that incident on either the 11.25° non-active area 541 centered at 101.25° or the active sector 630 centered at 281.25° can be detected by activating the active optic segments of sector 630, which is centered diametrically opposite 101.25° at 281.25°. Shape content in the light energy characteristic of that incident on either the 11.25° sector 550 centered at 112.5° the diametrically opposite portion of non-active area 631 that is centered at 292.5° can be detected by activating the active optic segments of sector 550. Shape content in the light energy characteristic of that incident on the 11.25° sector 560 centered at 123.75°. The diametrically opposite portion of non-active area 631 that is centered at 303.75° can be detected by activating the active optic segments of sector 560. Shape content in the light energy characteristic of that incident on the 11.25° non-active area 561 centered at 135° or active sector 640 centered at 315° can be detected by activating the active optic segments of sector 640, which is centered diametrically opposite 135° at 315°. Shape content in the light energy characteristic of that incident on the 11.25° sector 570 centered at 146.25° or non-active area 641 centered at 326.25° can be detected by activating the active optic segments of sector 570. Shape content in the light energy characteristic of that incident on the 11.25° non-active area 571 centered at 157.5° or active sector 650 centered at 337.5° can be detected by activating the active optic segments of sector 650, which is centered diametrically opposite 157.5° at 337.5°. Finally, shape content in the light energy characteristic of that incident on the 11.25° sectors 580 centered at 168.75° or non-active area 651 centered at 348.75° can be detected by activating the active optic segments of sector 580.

Figure 10B:
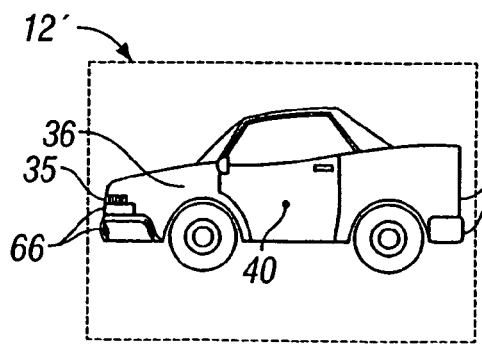

While it would be unnecessarily cumbersome to illustrate and describe the shape detecting and characterizing functionality of all the active optic segments of all the sectors 500, 510, 520, 530, 540, 550, 5.60, 570, 580, 590, 600, 610, 620, 630, 640, 650, it may be helpful for an understanding of the invention to illustrate and describe the functionality and results of activating several representative examples of the active optic segments in the active optic area 54. Therefore, FIG. 10*a* illustrates activation of the outer segment 508 of the active optic sector 500 by depicting bands of light energy 34 from the FT optic pattern 32 that are incident on and reflected by the outer segment 508. These bands of light energy 34, which are dispersed fartherest radially outward in the vertical direction in the FT optic pattern 32, emanated originally from, and correspond to, substantially vertically oriented lines, edges, features, or details in the image 12' that have a higher spatial frequency, such as the substantially vertical lines of the bumper and grill parts 35 in FIG. 10*b*. As explained above, the light energy 34 from the more intricate or closely spaced vertical parts or lines 66 (i.e., higher spatial frequency), such as those in the front bumper and grill portion 35 of the automobile in image 12', are dispersed farther radially outward from the optical center or axis 40, thus detectable by activating outer segments 506, 508 of vertical sector 500, while the light energy 34 from the less intricate, more isolated and semi-isolated or farther spaced apart vertical parts, edges, or lines (i.e., lower spatial frequency), such as the substantially vertical parts or lines 66' in the trunk and rear bumper portions of the image 12' in FIG. 10*b*, are dispersed not so far radially from the optical center or axis 40 and would be more detectable by inner segments 502, 504. The intensity of the light energy 34 in those respective dispersion bands, as explained above, depends on the brightness of the corresponding respective vertical features 35, 66, 66' in the image 12'. Again, the central portion 41 of the active optic area 54 can be ignored, if desired, because the light energy 54 in and near the center or axis 40 of the Fourier transform 32 (FIG. 5) emanates from features in image 12' with very low or virtually no spatial frequencies, such as the overall brightness of the image, which do very little, if anything, to define shapes. On the other hand, as also explained above, the center portion 41 can be fabricated as an active optic component to capture and reflect the light energy incident on the center portion 41 to the detector 80 as a measure of overall brightness, which may be useful in calibrating, adjusting brightness of the source light 25(*s*) (FIG. 5), calibrating intensity (I) measurements of sensors 84 in detector 80, and the like.

Figure 6C:
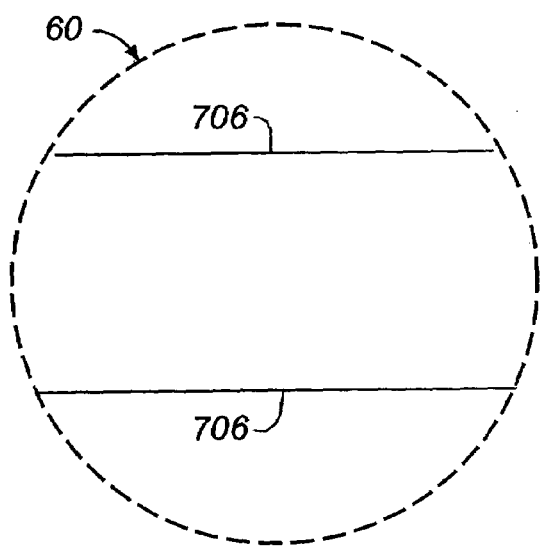

The light energy bands 34, when reflected by the activated outer segment 508, are filtered through the polarizing beam splitter 70 and projected in the filtered optic pattern 60, which is comprised primary of vertical lines or bands 62 of light energy illustrated diagrammatically in FIG. 6*c*, to the photodetector 80 (FIG. 5). As discussed above, the light energy in the filtered optic pattern 60 is detected by the light sensors 84 in detector array 82. The intensity (I) of light energy on each sensor 84 is recorded along with the sensor (pixel) location, preferably by x-y coordinates, and the angular orientation (R) of the sector 500. The radial position or scale (S) of the activated segment 508 (indicative of spatial frequency, as described above) is also recorded, for example, as RIXSel values described above. These values can be stored in a database 102 in association with information about the characterized image 12, such as image identification (ID), source location (URL, database address, etc.) of the image 12, digital format, resolution, colors, texture, shape, subject matter category, and the like.

To illustrate further, the near inner segment 504 of active optic sector 500 is shown in FIG. 11*a* as being selected to rotate plane of polarization of selected portions of the light energy bands 34 from the FT optic pattern 32 for isolation by the polarizing beam splitter 70 and then detection by the photodetector 80. This near inner segment 504 is also in the vertically oriented sector 500, but it is positioned or scaled radially closer to the optic axis 40 than the outer segment 508, which was activated in the previous example. Therefore, this near inner segment 504, when activated, captures light energy 34 in the FT optic pattern 32 that also corresponds to vertical lines, edges, etc., of the image 12', but to such lines, edges, etc., of lesser spatial frequency than those selected by the outer segment 508. For example, instead of the closely spaced, vertically oriented bumper and grill parts 35, the light energy 34 from the FT optic pattern 32 selected by the near inner segment 504 may be more characteristic of the more spatially semi-isolated, vertical edge 66' of the trunk lid and other vertical lines and edges 66 of similar semi-isolation in the automobile image 12' in FIG. 10*b*. Therefore, the light energy bands 62 in the resulting filtered beam 61(*s*), as shown in optic pattern 60 in FIG. 12*c*, are characteristic of such vertical shape content 66, 66' of lower spatial frequency in the image 12'.

Figure 12A:
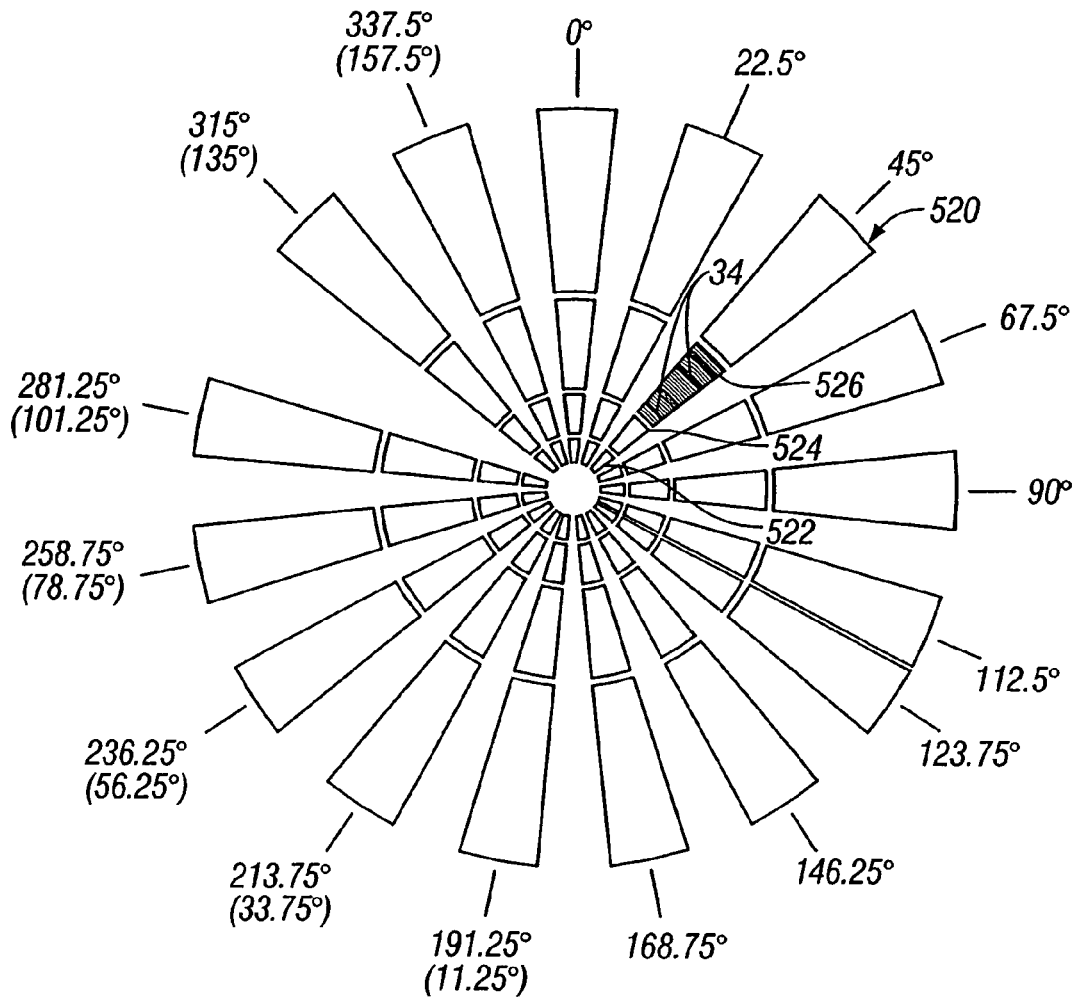
FIGS. 12a–b include diagrammatic, elevation views similar to FIGS. 10a–c, but illustrating a use of a near outer segment of an active optic sector that is oriented 45 degrees from vertical.
Figure 12B:
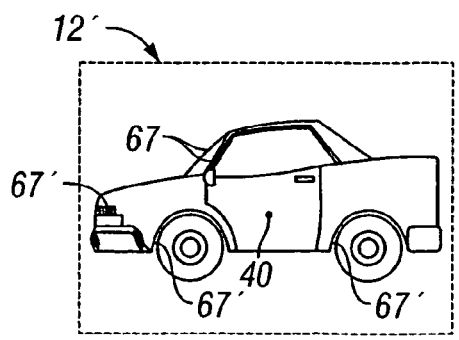
Figure 12C:
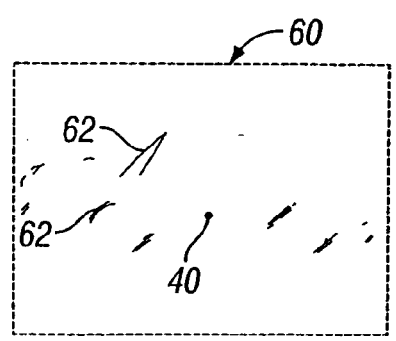

Another example angular orientation of light energy 34 from the FT optic pattern 32 is illustrated by FIGS. 12*a–c*. The near outer segment 526 in this example is activated to capture light from lines, edges, or features extending radially at an angular orientation of 45° from vertical. Such light energy 34 is characteristic of lines, edges, or features in the image 12' that extend at about 45° and that have some spatial frequency, i.e., are not isolated, such as, perhaps, the window post and roof support 67 in FIG. 8*b*. Such 45° oriented lines in the image 12' with even less spatial frequency, i.e., even more isolated, for example, the portions of the fender and hood edges 67', might be captured more by the near inner segment 524 or inner segment 522, although it is possible that some of such light energy could also be captured by near outer segment 506. The reflected and filtered beam 61(*s*) with the optical pattern 60 for these 45° angular oriented shape contents have bands 62 of the light energy oriented at about 45°, as illustrated diagrammatically in FIG. 8c. Such light energy bands 62 are detected by sensors 84 for photodetector 80 (FIG. 5) and are recorded and stored as characteristic of the spatial frequency of 45°-oriented shape content of the image 12'.

Capture and detection of horizontal portions of lines, edges, and features 68, 68' of the image 12' of respective spatial frequencies, if present in the image 12', is accomplished by activation of one or more segments 542, 544, 546, 548 of horizontal sector 540, which is oriented 90° from the vertical 0°. The portion of the light energy 34 that is reflected by each activated segments 542, 544, 546, 548 of the horizontal sector 540 is characteristic of all of the substantially horizontal features, parts, and lines 68 of the respective spatial frequencies in the image 12' that correspond to the light energy, if any, that is incident on those segments in the FT plane 32, as shown in FIG. 13b. Some curved features, parts, or lines in the image 12' have portions or line segments 68' that are also substantially horizontal, so those horizontal portions or line segments 68' also contribute to the light energy 34 that gets reflected by the horizontal sector 540 in FIG. 13a. The bands 62 of light energy in the filtered pattern 60, shown in FIG. 13c, resulting from the horizontal orientation of an activated segments 542, 544, 546, 548 in FIG. 13a, are also oriented substantially horizontal and are indicative of some or all of the shape characteristics 68, 68' of image 12' that are oriented substantially horizontal. Again, the inner segments 542, 544 are activated to detect light energy bands 34 from the FT optic pattern 32 that are dispersed closer to the optic axis 40, thus are characteristic of lower spatial frequency, horizontal shape content of the image 12', while higher spatial frequency, horizontal shape content can be detected by activating the outer segments 546, 548 of the horizontal sector 540. Thus, detection of the light energy bands 62 in FIG. 9c by detector array 82 (FIG. 5) facilitates encoding and recording of the horizontal shape characteristics of the image 12', as was described above.

One more example activated segment 598 in sector 590, is illustrated in FIG. 14a to describe the symmetric light energy detection feature described above. As explained above, the light energy bands 34 of the FT optic pattern 32 that are incident on the non-active area between the active optic sectors 500, 510 are symmetric with the diametrically opposite light energy bands 34, which are incident on the active optic segments 529, 594, 569, 598 in sector 590. Therefore, activation of a segment, for example, outer segment 598, as illustrated in FIG. 14a, will enable effective detection of the same shape content as is in the diametrically opposite, equivalent light energy 34, which is incident between the segments 508, 518 of respective sectors 500, 510. Likewise, activation of any other segment 592, 594, 596 enables effective detection of shape content in the other diametrically opposite portions of light energy that is incident in the non-active area 501 between active sectors 500 and 510. Therefore, detecting light energy 34 incident on the sector 590, which is centered at 191.25° in the example of FIG. 14a, is the equivalent of detecting light energy 34 that is incident on the non-active area 501 centered at 11.25°. The opposite also holds, i.e., detection of light energy 34 incident on the vertical sector 500, as illustrated in FIGS. 6a and 7a and described above, is the equivalent to detecting light energy from the FT optic pattern 32 that is incident on the non-active area 581 between active sectors 580 and 590.

Referring again to FIGS. 14a–c, the light energy 34 detected in the sector 590 corresponds to shape content 69, such as lines, edges, portions of curves, and the like in the image 12' that are oriented substantially at about 191.25°, which, being symmetrical, can also be expressed as oriented at about 11.25°. The light energy bands 62 in the reflected and filtered optic pattern 60 also have that same angular orientation, which is characteristic of the linear shape content of the image 12' that has that angular orientation and that has higher spatial frequency if reflected by outer segments 596, 598 or lower spatial frequency if reflected by inner segments 592, 594. the optic patterns 60 resulting from such various reflected portions of the FT optic pattern 32 are detected by the sensors 84 in detector array 82 for recording and storage, as described above.

It should be clear by now that any particular angular orientation R of segments of sectors in the active optic area 54 will allow detection of all the shape characteristics of image 12' that have substantially that same angular orientation R. It should also be clear that radial outward spacing or scale (S) of the segments relates to spatial frequency of such shape characteristics. Thus, all of the shape characteristics of the image 12' can be detected by detecting the bands 62 of the respective filtered patterns 60 with the segments at all angular orientations. However, as mentioned above, it is sufficient for most purposes to detect some, preferably most, but not necessarily all, of the shape characteristics of the image 12' by choosing to detect the light energy bands 34 of filtered patterns 60 at certain selected increments of or angular orientation or rotation R. Obviously, the bigger the increments of angular orientation of the sectors where light energy bands 34 are detected, the less precise the detected shape characteristics or contents of the image 12' will be. On the other hand, the smaller the increments of angular orientation, the more data that will have to be processed. Therefore, when selecting the angular increments of sectors at which light energy bands 34 will be detected and recorded, it may be desirable to strike some balance between preciseness of shape characteristics needed or wanted and the speed and efficiency of data processing and storage required to handle such preciseness. For example, but not for limitation, it is believed that detection and recording of the shape characteristics at angular increments of in a range of about 5 to 20 degrees, preferably about 11.25-degrees, will be adequate for most purposes. Also, the angular area of detection can be varied. For example, even if active optic sectors are oriented to detect shape characteristics at angular increments of 11.25°, the active optic areas could be narrow, such as in a range of 3° to 8°, more or less, which would filter out some of the optic energy from the FT optic pattern 32 between the sectors. However, such loss of light energy from non-active areas between sectors or other radially extending sensors, as described elsewhere in this specification, may not be detrimental to shape characterization by this invention, depending on specific applications of the technology to particular problems or goals.

Figure 15:
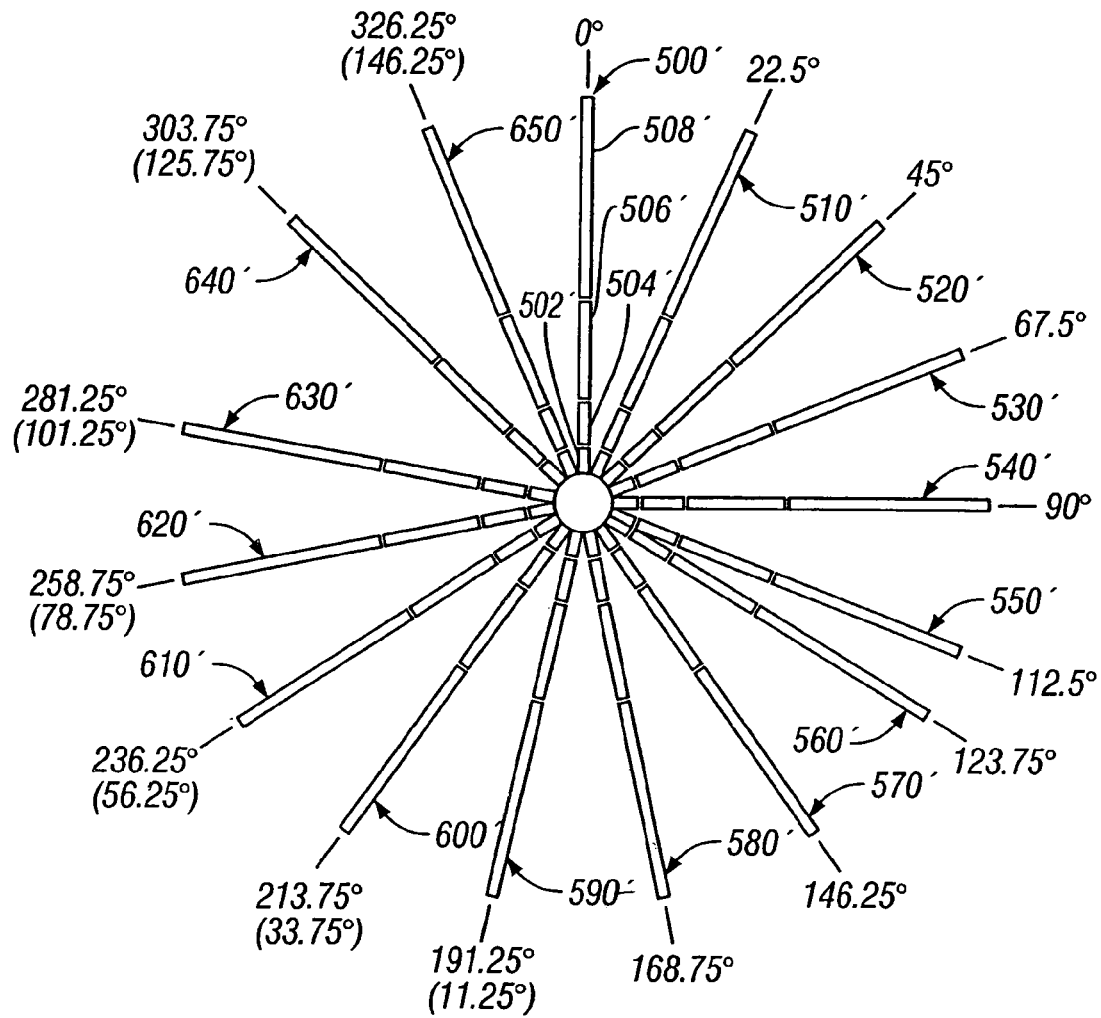
FIG. 15 is a diagrammatic elevation view similar to FIG. 10a, but illustrating a modified embodiment in which the active optic segments are rectangular instead of wedge-shaped.

Instead of the radially extending, wedge-shaped active optic sectors and segments of sectors described above, an alternate configuration can be comprised of radially extending, rectangular-shaped active optic modulators as illustrated diagrammatically in FIG. 15. These rectangular-shaped modulators 500', 510', 520', 530', 540', 550', 560', 570', 580', 590', 600', 610', 620', 630', 640', 650' can be at the same or different angular orientations as the wedge-shaped sectors described above, and each angular orientation can comprise several rectangular, active optic segments, such as segments 502', 504', 506', 508' of the modulator 500'. This arrangement does not capture as much of the light energy of an incident FT optic pattern 32 (FIG. 5) as the wedge-shaped segments and sectors described above, but shape resolution may be greater.

Figure 16:
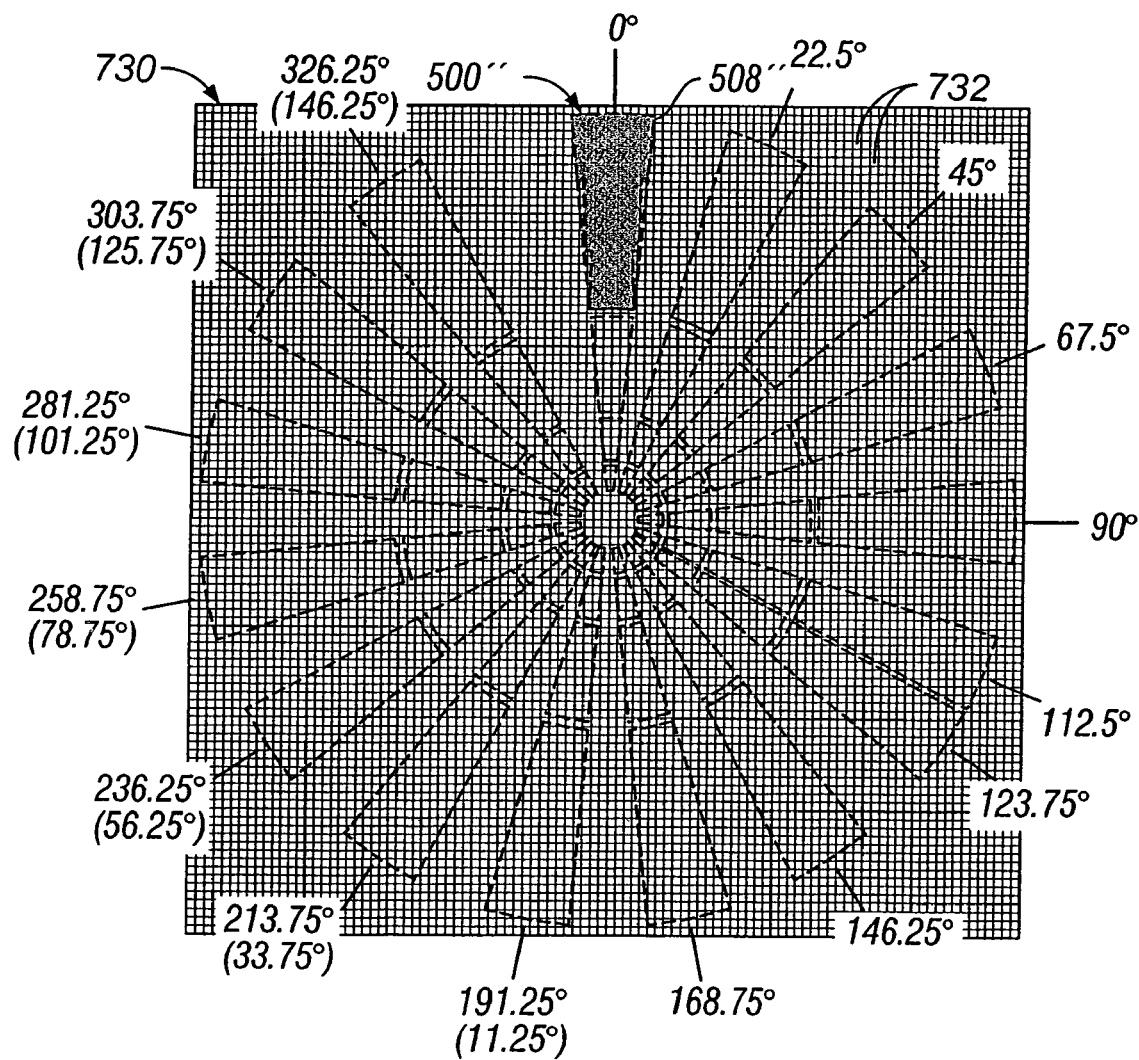
FIG. 16 is a diagrammatic elevation view of another embodiment in which groups of individually addressable light sensors in a pixel array of sensors can be activated together in locations that simulate sectors or segments of sectors to achieve angular and/or spatial analysis of a light beam for characterization of an image by shape content according to this invention.

Another, albeit less efficient embodiment, is illustrated in FIG. 16, where the desired sectors and segments, which are shown in phantom lines, can be formed by activating selected groups of light modulator elements 732 in a pixel array 730 type of spatial light modulator simultaneously. For example, a virtual outer segment 508" of a vertical sector 500" can be activated by activating simultaneously a segment group 508" of the light modulator pixel elements 602. While there are versatility advantages to this type of implementation, such advantages may be outweighed by the complexity and cost as compared to the simpler configurations described above.

Figure 17:
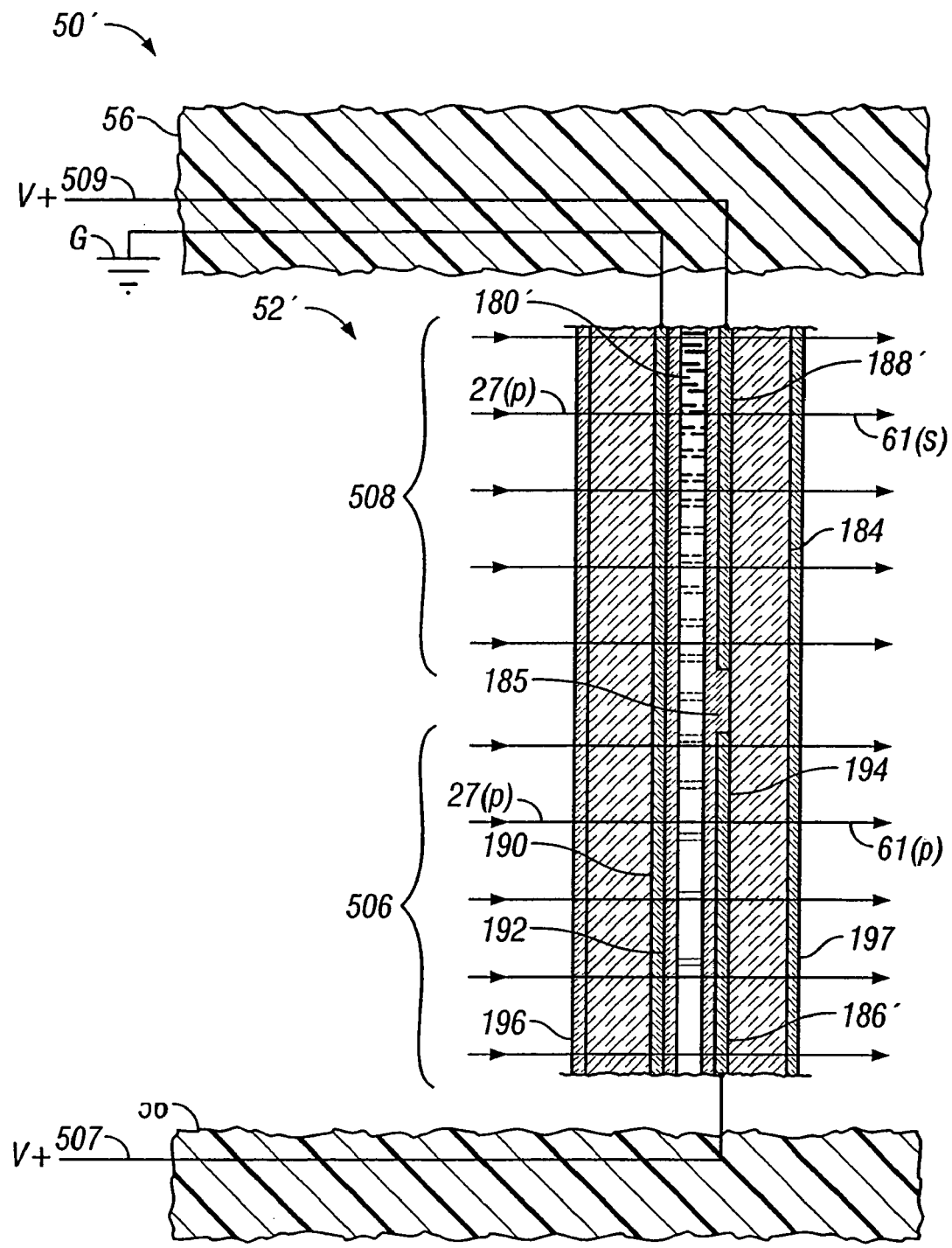
FIG. 17 is a cross-section view similar to FIG. 4, but illustrating a modification in which a modulated light beam passes through, instead of being reflected by, a segmented radial spatial light modulator in accordance with this invention.

While the reflective spatial light modulator structure described above in connection with the cross-sectional view of FIG. 4 may be applicable to all of the segmented radial SLM 50 configurations described above, an alternative, transmissive, spatial light modulator structure 50' illustrated in FIG. 17 could also be used with each of the configurations. In this embodiment 50', the metal reflective layers 186, 188 are replaced by transparent conducting layers 186', 188', such as indium tin oxide (ITO) or any of a number of other well-known transparent conducting materials. Therefore, incident 27(p) may or may not have its plane of polarization rotated, depending on whether a voltage V is applied to either layer 186' or 188', but, instead of being reflected, the light is transmitted through the device 50' to emerge as light energy 61(s) or 61(p), as indicated in FIG. 17. This device is mounted around its periphery in a base 56, so the base 56 does not interfere with the light 61(s) and 61(p) propagation. A different liquid crystal material 180' and/or a different thickness of liquid crystal material than the liquid crystal material 180 for the FIG. 4 embodiment would be required, since the light passes only once through the liquid crystal material 180'. However, such materials and their applications are readily available and well-known in the art and can be implemented by persons skilled in the art, once they understand the principles of this invention. Also, since the light 61(s) is transmitted rather than reflected, the polarizing beam splitter 70 (FIG. 5) would also have to be positioned behind the segmented radial SLM 50' of FIG. 17 instead of in front of it. However, this modification could also be implemented quite easily by persons skilled in the art, thus is not shown explicitly in FIG. 5.

In the description above of the preferred implementation of this invention, the shape content of a desired angular orientation (R) and scale (S) of an image is captured by masking or blocking all other light in the FT plane 32 from reaching the detector 80 so that only the light energy from that angular orientation (R) and scale segment of the FT plane 32 gets projected back into the spatial domain for detection. However, persons skilled in the art will recognize that this invention can also be practiced in the negative. In other words, instead of actuating the one or several segments and/or sectors to get shape content relevant to the angular orientation or rotation (R) and/or radial distance (S) of particular sectors and/or segments, as described above, it would also be feasible to actuate all of the other sectors and segments in the active optic area 54 and not actuate the specific sector and/or segments in order to get a negative or inverse of the shape content of the image. This procedure can be repeated for all of the desired angular (R) and/or scalar (S) sectors and segments so that the composite of information regarding light energy distribution collected and recorded represents a negative or inverse of all of the shape content of an image 12'.

For example, referring back to FIGS. 6a–c, the negative or inverse of the vertical shape content of FIG. 6a in the spatial domain after optical filtering in the FT plane 32 by the segmented radial SLM 50 (FIG. 5) would appear as the horizontal lines 706, similar to the way they appear in FIG. 6c, with the vertical lines 704 filtered out of the spatial image by the non-actuated inner segment 502 of vertical sector 500. If there was more shape content than the squares in FIG. 6a, then such additional shape content would also show in the negative spatial images, as long as it would not be in the vertical orientation and in the spatial frequency range that is filtered out of the image by the inner segment 502. Likewise, the negative or inverse of the horizontal shape content of FIG. 6a in the spatial domain after optical filtering in the FT plane 32 by the segmented radial SLM 50 would appear as the vertical lines 704, similar to the way they appear in FIG. 6b, with the horizontal lines filtered out of the spatial image.

Figure 10C:
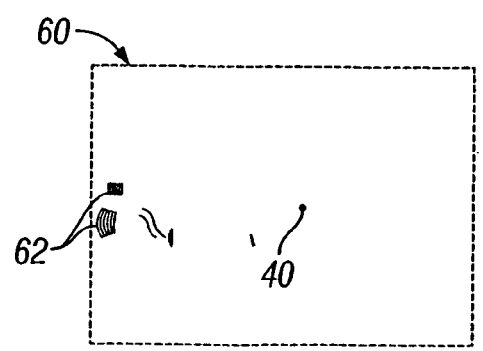

To explain further, a negative of the spatially filtered image 60 of the automobile illustrated in FIG. 10b would show all of the shape content of the automobile, except the vertical lines 62' shown in FIG. 10c. The same differences would apply to negatives for FIGS. 11c, 12c, 13c, and 14c.

Again, as with the positive spatial images of the shape content, such negative or inverse spatial images can be detected at 80 (FIG. 5) by pixels at x-y coordinate locations and intensity (I) and processed for storage with angular orientation (R) and, if desired, radial scale (S) of the non-actuated sectors and segments, as described above. Also, negative filtered image data can be converted to positive filtered image data and vice versa, as would be understood by persons skilled in the art.

The accuracy, versatility, and efficiency of shape characterizing, processing, storing, searching, comparing, and matching images according to this invention can be enhanced by some pre-processing of the images 12, 14, . . . , n when creating the optical patterns for the images 12', 14', . . . , n' at the SLM 26 in FIG. 5. One particularly beneficial method of such pre-processing is "ghosting" the image to allow more light energy into the optic pattern 12', thus also allowing more light energy into the FT optic pattern 32.

Figure 18A:
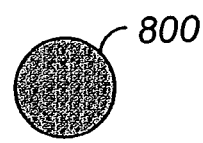
FIGS. 18a–c illustrates an optional ghosting technique for enhancing optical power transmission to improve shape information detection capability and to provide graded shape content characterization to enable identification of near matches of shape content in various images.
Figure 18B:
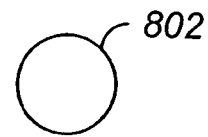
Figure 18C:
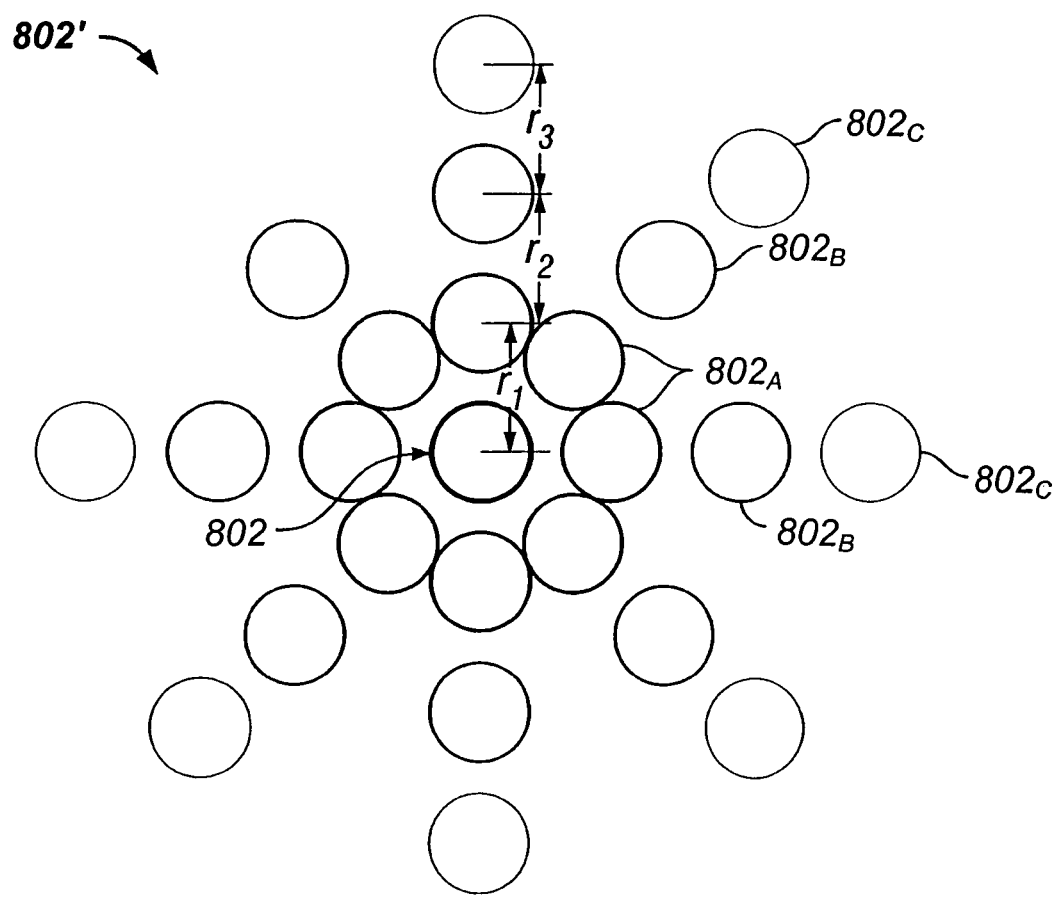

With reference now to FIGS. 18a–c, the ghosting process of this invention is illustrated first with an image content of a simple dot, such as a typed period 800, which is illustrated as greatly enlarged in FIG. 18a. The computer 20 (FIG. 5) or other microprocessor can first create an image of only the edge 802 of the dot 800, as illustrated in FIG. 14b. Myriad edge-finding software programs are available commercially to perform such edge-finding tasks, such as Labview IMAQ™ available from National Instrument Corporation, of 11500 Mopac Expressway, Austin, Tex. More complex images 12, 14, . . . , n would, of course, have more edge content. Elimination of non-edge content of the images 12, 14, . . . , n does not degrade the shape characterizing function or performance of this invention, because the edges define the shape characteristics and produce the detectable FT optic patterns 32. As was explained above, plain, uniform, unchanging portions of images, such as the side panel 36 of the automobile in image 12' or the clear blue sky in a landscape picture 14 do not contribute significant detectable shape content to such images. As also explained above, light energy from such plain, uniform, unchanging portions of images tends to focus on or very near the optic axis 40 in Fourier transform optic patterns 32, thus would be incident primarily on the center section 41 of the segmented radial SLM 50 (see FIG. 2) and is either not detected at all or detected only to determine background brightness of the image, as explained above.

After the image 800 is converted to an optic pattern of the edge content 802 of the image 800, as illustrated in FIG. 18b, it is ghosted by creating a plurality of ghost images of the edge content 802. For example, as illustrated in FIG. 18c, a plurality of ghost images $802_A$, $802_B$, $802_C$ are created and added to the optic pattern of the edge image 802. In this example, a first set of eight ghost images 802$_A$ is added a first radial distance r$_1$ outward from the original edge image 802 at 45° angular increments. A second set of eight more ghost images 802$_B$ are added another radial distance r$_2$ outward from the ghost images 802$_A$ and at 45° angular increments, and a third set of eight ghost images 802$_C$ are added another radial distance r$_3$ outward and at 45° increments. Each of the ghost images 802$_A$, 802$_B$, 802$_C$ have the same shape and are of the same size as the original edge image 802. Therefore, while there is more light energy and more spatial frequency in the ghosted image 802' of FIG. 18c than in the edge image 802 of FIG. 18b, there is no new shape content. Consequently, there will be both a wider radial dispersement and increased intensity of light energy 34 in the FT optic pattern 32 (FIG. 5), which can be detected with the segmented radial SLM 50 and detector 80. The higher intensity light energy makes it easier for the sensors 84 in detector 80 to detect the light energy diverted by the segmented radial SLM 50 to the detector 80.

The wider radial dispersion of light energy in FT optic pattern 32 due to the higher spatial frequency content in the ghosted image 802' of FIG. 18c, as compared to the non-ghosted image 802 of FIG. 18b, would also make the recorded pixels of detected light energy by the sensors 84 (FIG. 5) somewhat less precise, thus less unique to the image 800 or 802 than would be obtained by producing the image 800 or 802 on the SLM 26 instead of the ghosted image 802'. However, this decrease in resolution capability can actually be turned to an advantage for search and comparison applications, where near matches as well as matches are desired. As illustrated in FIG. 18c, the initial edge image pattern 802 is bright, the nearest ring of ghost edge images 802$_A$ is less bright, the next ring of ghost edge images 802$_B$ is even less bright, and the outermost ring of ghost edge images 802$_C$ is less bright yet. However, the ghost images 802$_A$, 802$_B$, 802$_C$ increase the spatial frequency of the image 802', thus cause more radial dispersion of the light energy bands 34 in the FT optic pattern 32. Consequently, the portions of the light energy bands 34 that originate from the initial edge image 802 in the center of the ghosted pattern 802' are brighter, i.e., more intense, than portions of the light energy bands 34 that originate from the ghost images 802$_A$, 802$_B$, 802$_C$. Therefore, while more sensors 84 of the detector array 82 will detect light energy reflected by the segmented radial SLM 50 to the detector 80 for a ghosted image 802', the sensors 84 that sense the highest intensity (I) light energy will be the sensors 84 that correspond to the initial edge image 802, and those intensities can be recorded and stored for future access, analysis, searching, matching, and/or retrieving, as described above. The lesser intensities detected by other sensors 84 for light energy emanating from the nearest ring of ghost images 802$_A$ are also recorded and stored, as are those even lesser light intensities emanating from the other rings of ghost images 802$_B$, 802$_C$ sensed by still other sensors 84. Therefore, in a search and matching process with other images, matches to the brightest or highest intensities of both images would indicate the highest probability that the respective images are the same. If no such match can be found to the brightest or highest intensity pixels, RIXels, RIXSels, or other records of optic patterns that are characterized as described above, then comparisons to lesser intensities corresponding to ghost images 802$_A$, 802$_B$, 803$_C$ can be attempted to find near matches.

The ghosting process is quite simple and can be scaled to achieve a desired result. Essentially, a software program can simply be applied to reproduce each pixel of an image at selected locations, at selected distances, and at selected angular orientations in relation to such pixel, as illustrated in the simple example of the dot 800 in FIGS. 18a–c. An example of this ghosting process in a slightly more complex image 810 in the shape of a house is illustrated in FIGS. 19a–c. The edges of the uniform or featureless areas of the house image 810 are found and produced in an edge image 812, which maintains the shape content of the image 810, as explained above. Then the ghosting process described above is applied to the edge image 812, as illustrated in FIG. 18c, to create ghost images 812$_A$, 812$_B$, 812$_C$, et seq., at selected distances, angular orientations, and decreasing brightnesses the farther the ghost images 812$_A$, 812$_B$, 812$_C$ are from the initial edge image 812.

The ghosting process of this invention can also be applied to images for which edges have not been found or produced, as described above. However, more pixel processing by the computer 20 or other processor would be required, and resulting shape resolution may not be as sharp.

Since these and numerous other modifications and combinations of the above-described method and embodiments will readily occur to those skilled in the art, it is not desired to limit the invention to the exact construction and process shown and described above. For example, Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features or steps, but they do not preclude the presence or addition of one or more other features, steps, or groups thereof.

The embodiments of the invention in which an exclusive property or privilege is claimed include:

1. A method of characterizing an image for shape content, comprising:
   producing a Fourier transform optic pattern of the image with light energy;
   spatial filtering the light energy from the Fourier transform optic pattern by selecting light energy from discrete portions of the Fourier transform optic pattern at a plurality of discrete angular orientations and separating such discrete portions from other portions of the Fourier transform optic pattern to create a plurality of filtered Fourier transform patterns of light energy from those discrete portions;
   projecting the light energy of the filtered Fourier transform patterns into spatial domain images of shape content;
   detecting intensities of light energy as it is distributed in the spatial domain images of shape content for the respective angular orientations; and
   storing the intensities of light energy detected in the spatial domain images of shape content along with the respective angular orientations.

2. The method of claim 1, wherein spatial filtering the light energy from the Fourier transform optic pattern includes:
   focusing the Fourier transform optic pattern onto an active optic area of a spatial light modulator;
   selecting light energy from the discrete portions of the Fourier transform optic pattern at a plurality of angular orientations for separation by selectively activating portions of the spatial light modulator at selected angular orientations to rotate plane of polarization of the discrete portions of the light energy of the Fourier transform optic pattern; and
   separating the light energy with the rotated plane of polarization from light without the rotated plane of polarization.

3. The method of claim 2, including selectively activating portions of the spatial light modulator at selected segments positioned in said angular orientations and at and different radial distances with respect to an optic axis of the Fourier transform optic pattern.

4. The method of claim 2, including selectively activating portions of the spatial light modulator to rotate plane of polarization of light energy in the Fourier transform optic pattern that is incident on selected sectors of the active optic area of the spatial light modulator that extend radially in discrete angular orientations with respect to an optic axis of the Fourier transform optic pattern.

5. The method of claim 4, including selectively activating portions of the spatial light modulator to rotate plane of polarization of light energy in the Fourier transform optic pattern that is incident on selected segments of the selected sectors to produce shape content in the spatial domain images that corresponds in angular orientation to the angular orientations of the sectors with respect to the optic axis and that correspond in spatial frequency to radial positions of the selected segments with respect to the optic axis.

6. The method of claim 5, including:
detecting intensities of light energy as it is distributed in the spatial domain images of shape content for the respective angular orientations of the selected sectors and for the respective radial positions of the selected segments of the selected sectors; and
storing the intensities of light energy detected in the spatial domain images of shape content along with the respective angular orientations and along with the respective radial positions.

7. The method of claim 6, including:
detecting the intensities of the light energy as it is distributed in the spatial domain images of shape content by focusing the spatial domain images of shape content on an array of photodetector elements that are capable of detecting intensities of light energy incident on such elements and of producing signals that are indicative of the respective intensities of light energy detected by the respective elements for pixel portions of the spatial domain images of shape content; and
storing the intensities (I) of light energy detected in the pixel portions of the spatial domain images of shape content as detected by the photodetector elements in the array for each angular orientation (R) and for each radial position (S), including positions of the respective pixel portions where such intensities (I) are detected.

8. The method of claim 1, including:
producing a plurality of ghost images around the image that is being characterized, each ghost image having shape content that is substantially the same as the image being characterized; and
producing the Fourier transform optic image from the ghost images along with the image being characterized.

9. The method of claim 6, including producing the ghost images with each ghost image having less light energy than the image being characterized.

10. The method of claim 6, including replicating original pixels that comprise the image being characterized and offsetting each such replicated pixel from its corresponding original pixel by an equal distance and angular orientation to the original pixel to create a ghost image.

11. The method of claim 8, including dispersing the plurality of ghost images in a symmetrical manner around the image being characterized.

12. The method of claim 6, including:
finding edges of the shape content in the image being characterized an edge image of the shape content;
replicating original pixels that comprise the edge image; and
offsetting each such replicated pixel from its corresponding original pixel by an equal distance and angular orientation to the original pixel to create a ghost image.

13. The method of claim 10, replicating the pixels that comprise the ghost image with less light energy than the corresponding pixels of the edge image.

14. An optical image shape content analyzer, comprising:
a Fourier transform lens having a focal point in focal plane at a focal distance;
a spatial light filter comprising: (i) a filter spatial light modulator that has an active optic area around a central axis positioned in the focal plane of the Fourier transform lens with the central axis coincident with the focal point, said active optic area comprising discrete active optic components that are capable of selective activation to selectively rotate or not rotate plane of polarization of light incident at various angular orientations in relation to the central axis; and (ii) a polarization analyzer that is capable of separating light polarized in one plane from light polarized in another plane;
an image producing spatial light modulator with an associated light source, wherein the image producing spatial light modulator is addressable to produce an image in an optic pattern with light from the associated light source, said image producing spatial light modulator being positioned to project such an image optic pattern of light through the Fourier transform lens to form a Fourier transform optic pattern of the image optic pattern at the focal plane of the Fourier transform lens; and
a photodetector positioned to receive light filtered by the spatial light filter, said detector including an array of sensors that are capable of detecting filtered patterns of light energy intensities in the filtered light.

15. The optical image shape content characterizer of claim 14, wherein the discrete active components are disposed in the active optic area in a manner that extends radially outward at various angular orientations in relation to the central axis.

16. The optical image shape content characterizer of claim 15, wherein the discrete active components comprise individual sectors of the active optic area.

17. The optical image shape content characterizer of claim 16, wherein the discrete active components comprise individually addressable segments of the sectors.

18. The optical image shape content characterizer of claim 17, wherein the individually addressable segments are disposed radially in relation to the central axis to form the active optic sectors.

19. The optical image shape content characterizer of claim 15, wherein the discrete active components comprise rectangular components extending radially in relation to the central axis.

20. The optical image shape content characterizer of claim 15, wherein the active optic area comprises a rectangular spatial light modulator array of active optic elements and the discrete active components comprise active optic elements of a rectangular array of such elements that are activatable in distinct groups of such elements that extend radially outward in relation to the central axis.

* * * * *